US012804093B2

(12) United States Patent
Abe

(10) Patent No.: US 12,804,093 B2
(45) Date of Patent: Nov. 17, 2026

(54) INFORMATION PROCESSING SYSTEM, NON-TRANSITORY COMPUTER READABLE MEDIUM AND INFORMATION PROCESSING METHOD FOR SHARING SETTING INFORMATION AND USING REFERENCE INFORMATION

(71) Applicant: FUJIFILM Business Innovation Corp., Tokyo (JP)

(72) Inventor: Masaki Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/460,682

(22) Filed: Sep. 4, 2023

(65) Prior Publication Data

US 2024/0323293 A1 Sep. 26, 2024

(30) Foreign Application Priority Data

Mar. 23, 2023 (JP) ................................ 2023-046710

(51) Int. Cl.
*H04N 1/00* (2006.01)

(52) U.S. Cl.
CPC ....... *H04N 1/0097* (2013.01); *H04N 1/00973* (2013.01)

(58) Field of Classification Search
CPC .......................... H04N 1/0097; H04N 1/00973
See application file for complete search history.

(56) References Cited

U.S. PATENT DOCUMENTS 8,699,044 B2 4/2014 Nakahara
2008/0212137 A1* 9/2008 Iwata ...................... G06F 3/123 358/1.16
2010/0214588 A1* 8/2010 Nakahara ........... H04N 1/00413 358/1.15
2023/0179636 A1* 6/2023 Kimura ................... H04L 63/20 726/6
2023/0305777 A1* 9/2023 Hosomizo ............. G06F 3/1257

FOREIGN PATENT DOCUMENTS

JP 2010199665 9/2010
JP 2021060934 4/2021
JP 2021093699 6/2021

* cited by examiner

*Primary Examiner* — Ming Y Hon
(74) *Attorney, Agent, or Firm* — JCIPRNET

(57) ABSTRACT

An information processing system includes one or more processors, each processor configured to: if a setting item in a first setting file of a first target apparatus and a corresponding setting item in a second setting file of a second target apparatus have identical setting information set, register the second setting file by using, as setting information at the setting item in the second setting file, reference information referencing the identical setting information.

14 Claims, 28 Drawing Sheets

FIG. 6

13

| DEVICE IDENTIFICATION INFORMATION | SETTING FILE | |
|---|---|---|
| | SETTING ITEM | SETTING INFORMATION |
| a | A | 12345 |
| | B | 3456 |
| | C | ABC |
| | D | XYZ |
| | ⋮ | ⋮ |
| b | A | 3567 |
| | B | Ref−a |
| | C | Ref−a |
| | D | Ref−a |
| | ⋮ | ⋮ |
| ⋮ | ⋮ | ⋮ |

FIG. 20

13

| DEVICE IDENTIFICATION INFORMATION | SETTING FILE | | DEFAULT INFORMATION |
|---|---|---|---|
| | SETTING ITEM | SETTING INFORMATION | |
| a | A | 12345 | – |
| | B | 3456 | – |
| | C | ABC | – |
| | D | XYZ | – |
| | ⋮ | ⋮ | ⋮ |
| b | A | 3567 | – |
| | B | Ref–a | 1111 |
| | C | Ref–a | 2222 |
| | D | Ref–a | 3333 |
| | ⋮ | ⋮ | ⋮ |
| ⋮ | ⋮ | ⋮ | ⋮ |

FIG. 27

70

```
<configuration>
  <login>
    <reference type="IP">123.456.789.000</reference>
  </login>
  <copy-color>
    <reference type="IP">123.456.789.000</reference>
    <default>color</default>
  </copy-color>
  <fax-support>
    <reference type="serial">987.654.321</reference>
    <default>false</default>
  </fax-support>
  <billing-method>
    <value>coin-kit</value>
  </billing-method>
</configuration>
```

FIG. 28

DEFAULT,
REFERENCE DESTINATION)
A: 9876, Ref−a
B: 1111, Ref−c
D: NONE, Ref−a
. . .

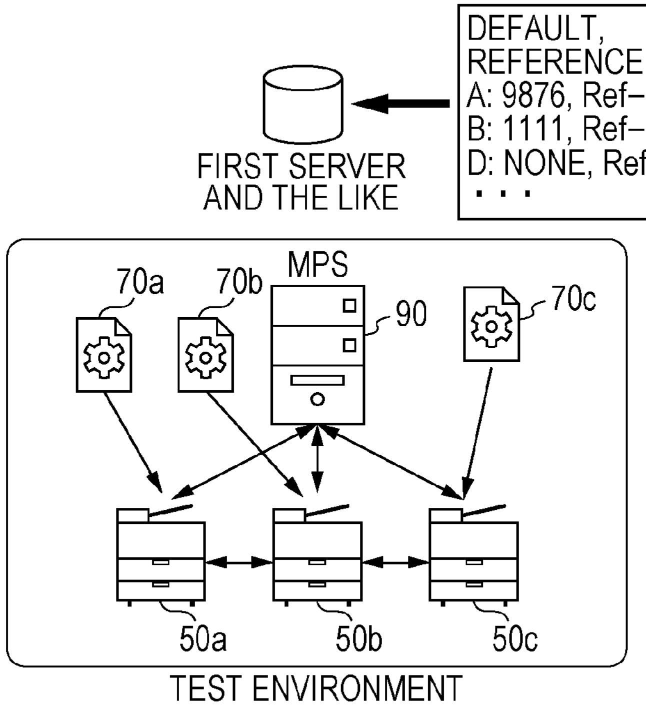

SETTING b)
A: 3567 (DEFAULT INFORMATION: 1234,
SUBSTITUTE REFERENCE INFORMATION: Ref−b,
REPLACEMENT INHIBITED)
B: Ref−a (DEFAULT INFORMATION: 9999,
SUBSTITUTE REFERENCE INFORMATION: NOT SPECIFIED)
C: Ref−a (DEFAULT INFORMATION: NOT SPECIFIED,
SUBSTITUTE REFERENCE INFORMATION: NOT SPECIFIED)
D: Ref−c (DEFAULT INFORMATION: NOT SPECIFIED,
SUBSTITUTE REFERENCE INFORMATION: Ref−a)
. . .

REPLACED WITH

SETTING b)
A: 3567 (DEFAULT INFORMATION: 1234,
SUBSTITUTE REFERENCE INFORMATION: Ref−b)
B: Ref−a (DEFAULT INFORMATION: 9999,
SUBSTITUTE REFERENCE INFORMATION: Ref−c)
C: Ref−a (DEFAULT INFORMATION: NOT SPECIFIED,
SUBSTITUTE REFERENCE INFORMATION: NOT SPECIFIED)
D: Ref−c (DEFAULT INFORMATION: NOT SPECIFIED,
SUBSTITUTE REFERENCE INFORMATION: Ref−a)
. . .

INFORMATION PROCESSING SYSTEM, NON-TRANSITORY COMPUTER READABLE MEDIUM AND INFORMATION PROCESSING METHOD FOR SHARING SETTING INFORMATION AND USING REFERENCE INFORMATION

CROSS-REFERENCE TO RELATED APPLICATIONS

This application is based on and claims priority under 35 USC 119 from Japanese Patent Application No. 2023-046710 filed Mar. 23, 2023.

BACKGROUND

(i) Technical Field

The present disclosure relates to an information processing system, a non-transitory computer readable medium and an information processing method.

(ii) Related Art

Japanese Unexamined Patent Application Publication No. 2021-60934 discloses an information processing apparatus in a system that manages settings of devices. The information processing apparatus takes over setting values if one device is replaced with another.

The information processing apparatus includes a storage unit, acquisition unit, and a memory. The storage unit stores identification information on each device, configuration information indicating the configuration of each device and device information indicating setting information indicating settings of each device. If a new device having identification information not included in the device information is communicably connected, the acquisition unit performs an operation that compares the configuration information on the new device with the configuration information included in the device information and retrieves from the device information setting information set for a device having matched configuration information. The memory stores the retrieved setting information as the setting information on the new device.

In a method currently being implemented, before a pre-installation of a variety of target apparatuses, such as a multi-function apparatus or a personal computer, setting and testing are performed in advance in a virtual environment that reproduces an environment of an installation location and a resulting setting file is uploaded to a cloud server. In this method, during the actual installation, the setting file is downloaded with the cloud server connected after a network setting is completed and thus tested settings are set at a time.

In this method, however, the production and testing of the setting file have to be performed individually on a per target apparatus basis and as the number of target apparatuses increases, time for the production and testing of the setting files may increase.

SUMMARY

Aspects of non-limiting embodiments of the present disclosure relate to providing an information processing system, non-transitory computer readable medium and information processing method reducing the time for the production and testing of the setting file in view of when the production and testing of the setting file are individually performed on each of the target apparatuses.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including one or more processors, each processor configured to: if a setting item in a first setting file of a first target apparatus and a corresponding setting item in a second setting file of a second target apparatus have identical setting information set, register the second setting file by using, as setting information at the setting item in the second setting file, reference information referencing the identical setting information.

BRIEF DESCRIPTION OF THE DRAWINGS

Exemplary embodiments of the present disclosure will be described in detail based on the following figures, wherein:

FIG. 6 schematically illustrates a structure example of a setting file database according to the exemplary embodiments of the disclosure;

FIG. 20 schematically illustrates a structure example of a setting file database according to the third and fourth exemplary embodiments of the disclosure;

FIG. 27 illustrates a specific example of the setting file of the exemplary embodiments of the disclosure; and FIG. 28 schematically illustrates a setting file production process and setting file reflection process according to other exemplary embodiments of the disclosure.

DETAILED DESCRIPTION

Exemplary embodiments of the disclosure are described in detail with reference to the drawings.

In the exemplary embodiments, a first target apparatus and second target apparatus based on the technique according to the disclosure are image forming apparatuses. The disclosure is not limited to the exemplary embodiments. For example, the first target apparatus and second target apparatus based on the technique according to the disclosure may be any apparatuses that involve settings of setting information on a location where the apparatuses are actually installed and used. Such apparatuses may include an information processing apparatus, such as a personal computer, and a variety of home appliances.

According to the exemplary embodiments, the technique related to the disclosure is a technique where, before a pre-installation of the image forming apparatus, setting and testing are performed beforehand in a virtual environment (hereinafter referred to as a "test environment") that reproduces an environment at an installation location and a resulting setting file is uploaded to a cloud server. According to the technique, a network setting of the image forming apparatus is completed during the actual installation of the image forming apparatus and the setting file is downloaded with the cloud server connected. The tested settings are thus set at a time.

First Exemplary Embodiment

Figure 1:
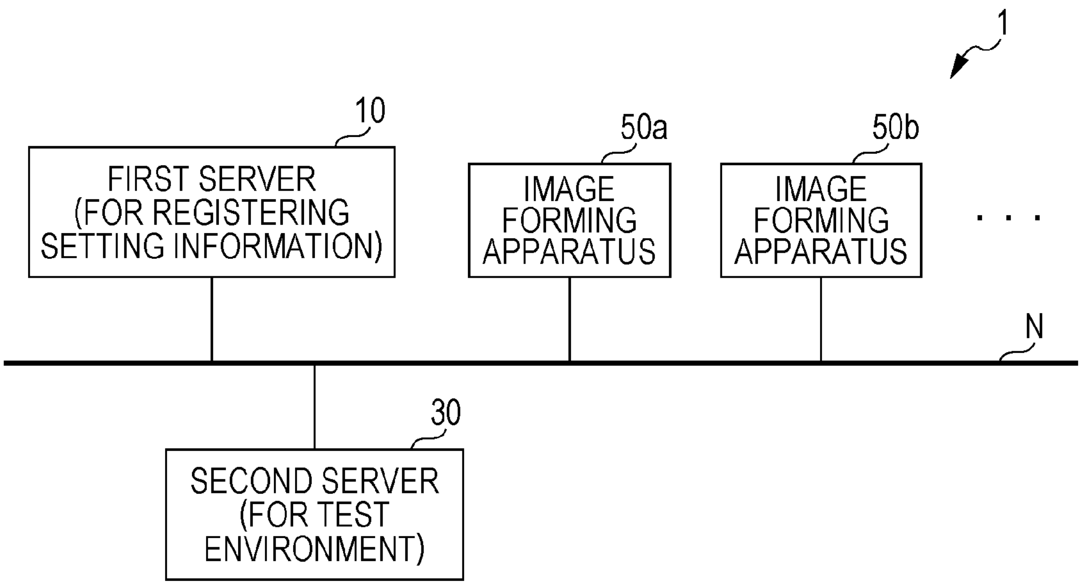
FIG. 1 is a block diagram illustrating an example of a configuration of an information processing system according to exemplary embodiments of the disclosure.

The configuration of the information processing system 1 of a first exemplary embodiment is described below with reference to FIG. 1. FIG. 1 is a block diagram illustrating the configuration of the information processing system 1 of the first exemplary embodiment.

Referring to FIG. 1, the information processing system 1 of the first exemplary embodiment includes a first server 10 and second server 30, each formed as a cloud server, and multiple image forming apparatuses 50*a*, 50*b*, . . . . In the discussion that follows, the image forming apparatuses 50*a*, 50*b*, . . . , if representatively described, are simply referred to as an "image forming apparatus 50."

The first server 10 of the first exemplary embodiment is the cloud server to which the setting file is uploaded and the second server 30 is where the test environment is constructed.

The first server 10 and second server 30 are information processing apparatuses, such as a personal computer or server computer. According to the first exemplary embodiment, the image forming apparatus 50 is a digital multifunction apparatus having an image print function, image reading function and image transmission function. The disclosure is not limited to this configuration. The image forming apparatus 50 may be any other image forming apparatus, such as an image forming apparatus having only the image print function or an image forming apparatus having both the image print function and image reading function.

The first server 10, second server 30 and image forming apparatus 50 are communicably interconnected to each other via a network N.

According to the first exemplary embodiment, the network N may be a combination of the Internet, public communication network, such as a telephone network and an in-house communication network, such as a local-area network (LAN) and wide-area network (WAN). The disclosure is not limited to this configuration. For example, the network N may include only the public communication network or the in-house communication network. According to the first exemplary embodiment, the network N includes a wired and wireless communication networks. The disclosure is not limited to this configuration. The network N may include only the wired network or wireless network.

Figure 2:
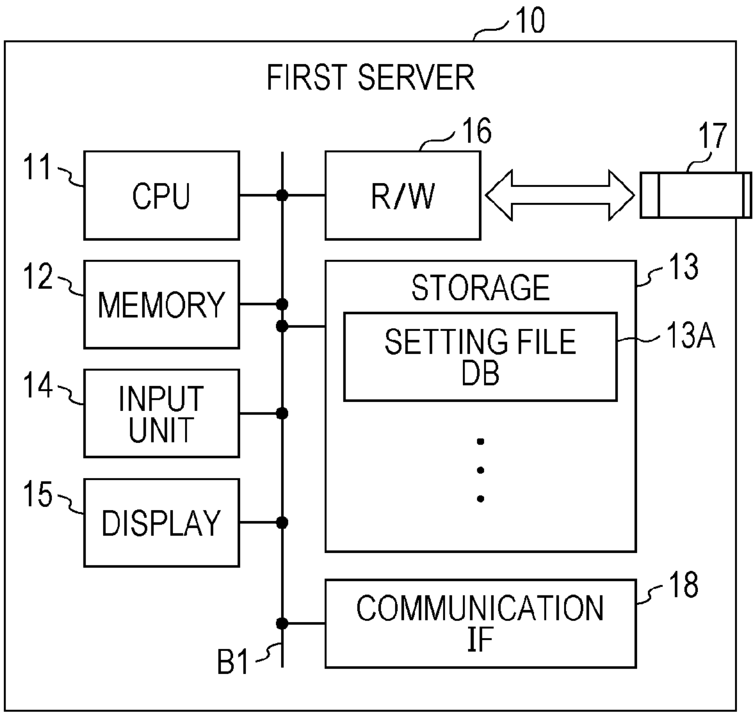
FIG. 2 is a block diagram illustrating an example of an electrical configuration of a first server according to first and second exemplary embodiments of the disclosure.

The configuration of the first server 10 of the first exemplary embodiment is described with reference to FIG. 2. FIG. 2 is a block diagram illustrating an example of an electrical configuration of the first server 10 of the first exemplary embodiment.

Referring to FIG. 2, the first server 10 of the first exemplary embodiment includes a central processing unit (CPU) 11 as a processor, memory 12 serving as a temporary memory region, non-volatile storage 13, input unit 14, such as a keyboard and mouse, display 15, such as a liquid-crystal display, medium reader and writer (R/W) 16 and communication IF 18. The CPU 11, memory 12, non-volatile storage 13, input unit 14, display 15, medium R/W 16 and communication IF 18 are mutually interconnected to each other via a bus B1. The medium R/W 16 reads information from the recording medium 17 and/or writes information onto the recording medium 17.

The storage 13 of the first exemplary embodiment may be implemented by a hard-disk drive (HDD), solid-state drive (SSD) or flash memory. The storage 13 serving as a recording medium stores a setting file database 13A. The setting file database 13A is described in detail below.

Figure 3:
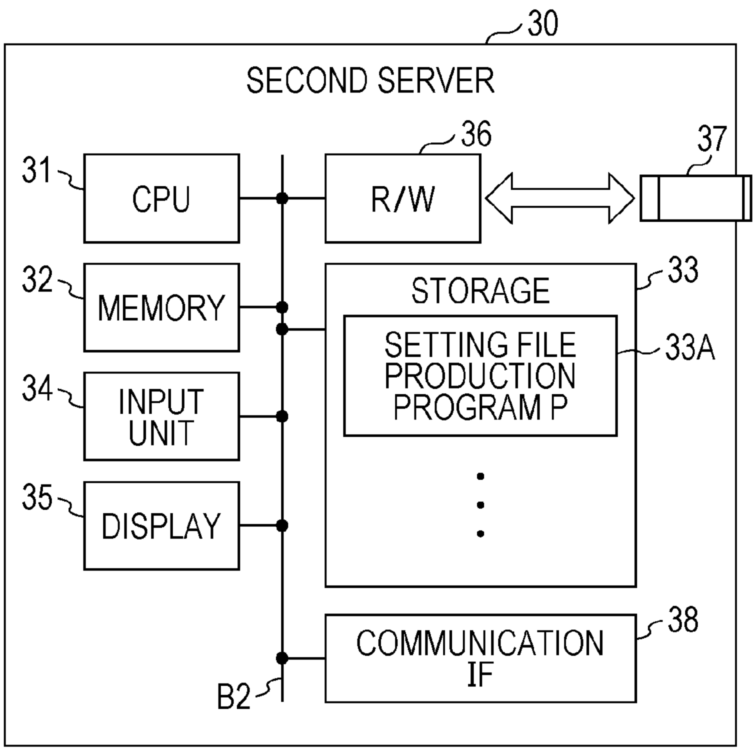
FIG. 3 is a block diagram illustrating an example of an electrical configuration of a second server according to the exemplary embodiments of the disclosure.

The configuration of the second server 30 of the first exemplary embodiment is described with reference to FIG. 3. FIG. 3 is a block diagram illustrating an example of an electrical configuration of the second server 30 of the first exemplary embodiment.

Referring to FIG. 3, the second server 30 of the first exemplary embodiment includes a CPU 31 serving as a processor, memory 32 serving as a temporary memory region, non-volatile storage 33, input unit 34 including a keyboard and mouse, display 35, such as a liquid-crystal display, medium R/W 36 and communication IF 38. The CPU 31, memory 32, non-volatile storage 33, input unit 34, display 35, medium R/W 36 and communication IF 38 are interconnected to each other via a bus B2. The medium R/W 36 reads information from the recording medium 37 and/or writes information onto the recording medium 37.

The storage 33 of the first exemplary embodiment includes an HDD, SSD or flash memory. The storage 33 serving as a recording medium stores a setting file production processing program 33A. The setting file production processing program 33A is stored (installed) onto the storage 33 when the recording medium 37 having the setting file production processing program 33A written thereon is connected to the medium R/W 36 and the medium R/W 36 reads the setting file production processing program 33A from the recording medium 37. The CPU 31 reads the setting file production processing program 33A as appropriate from the storage 33 and loads the setting file production processing program 33A onto the memory 32 and performs a process defined by the setting file production processing program 33A.

Figure 4:
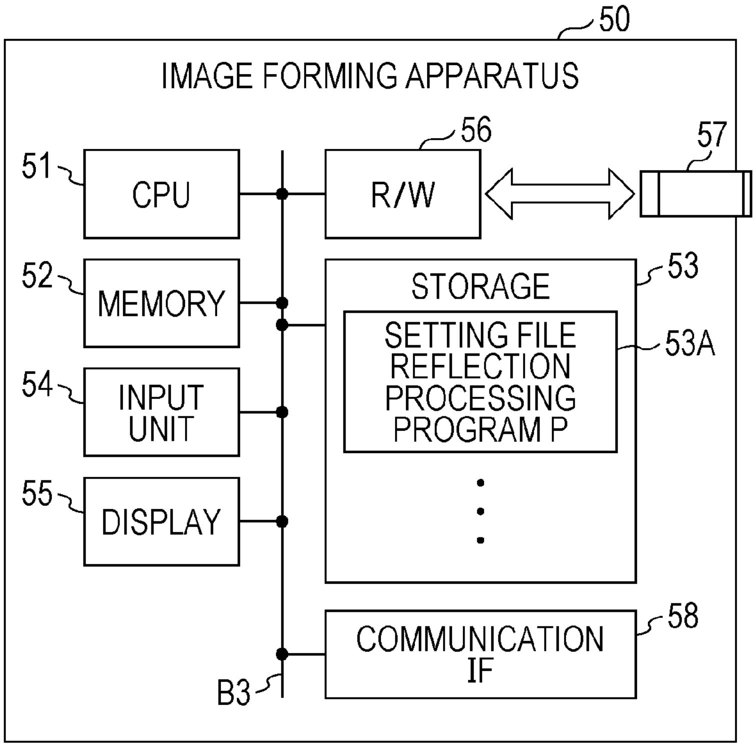
FIG. 4 is a block diagram illustrating an electrical configuration of an image forming apparatus according to the exemplary embodiments of the disclosure.

The configuration of the image forming apparatus 50 of the first exemplary embodiment is described with reference to FIG. 4. FIG. 4 illustrates an example of an electrical configuration of the image forming apparatus 50 of the first exemplary embodiment.

Referring to FIG. 4, the image forming apparatus 50 of the first exemplary embodiment includes a CPU 51 serving as a processor, memory 52 as a temporary memory region, non-volatile storage 53, input unit 54 including a variety of switches, display 55, such as a liquid-crystal display, medium R/W 56 and communication IF 58. The CPU 51, memory 52, non-volatile storage 53, input unit 54, display 55, medium R/W 56 and communication IF 58 are interconnected to each other via a bus B3. The medium R/W 56 reads information from the recording medium 57 and/or writes information onto the recording medium 57.

The storage 53 of the first exemplary embodiment includes an HDD, SSD or flash memory. The storage 53 serving as a recording medium stores a setting file reflection processing program 53A. The setting file reflection processing program 53A is installed onto the storage 53 when the recording medium 57 having the setting file reflection processing program 53A written thereon is connected to the medium R/W 56 and the medium R/W 56 reads the setting file reflection processing program 53A from the recording medium 57. The CPU 51 reads the setting file reflection processing program 53A as appropriate from the storage 53 and loads the setting file reflection processing program 53A onto the memory 52 and performs a process defined by the setting file reflection processing program 53A.

Figure 5:
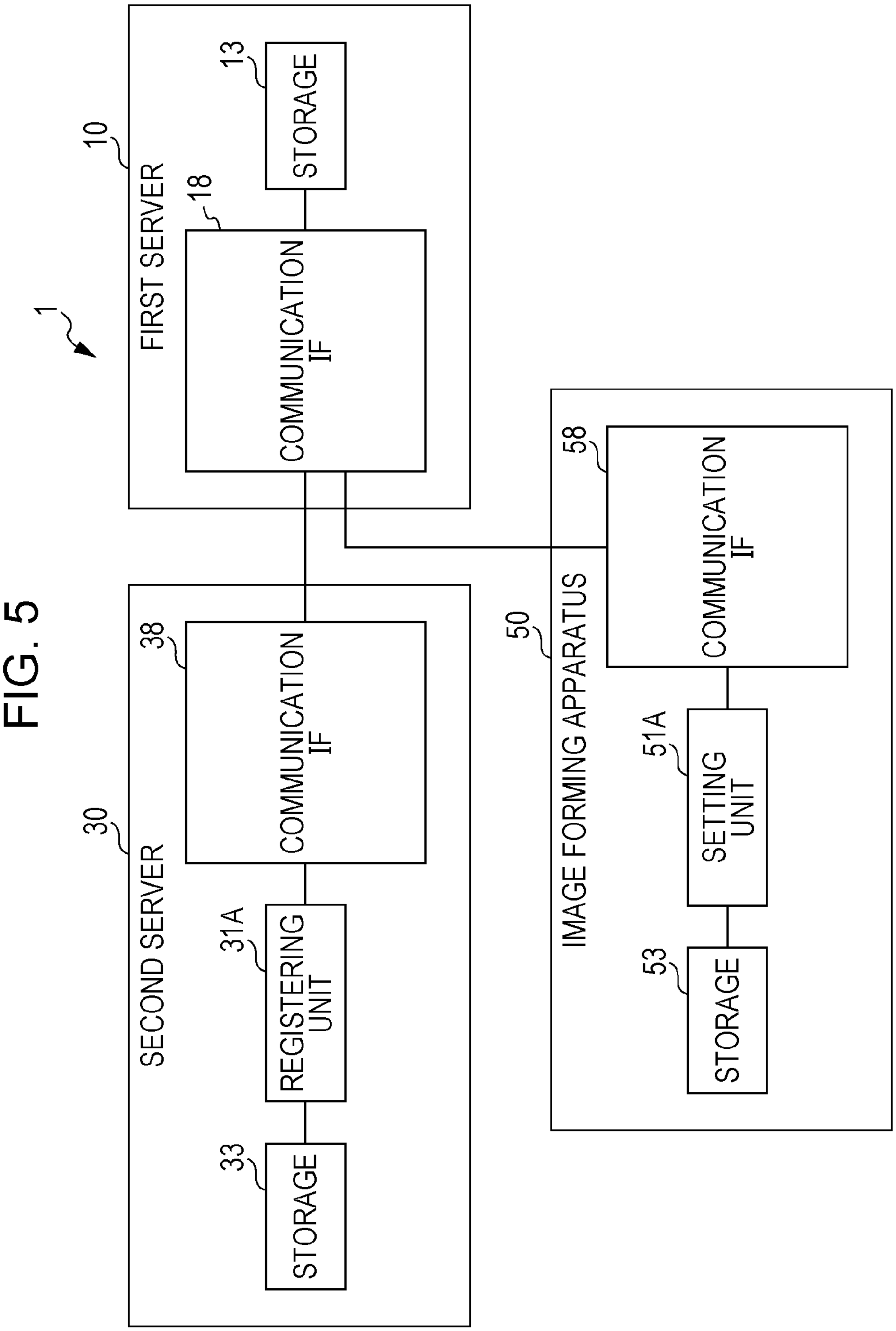
FIG. 5 is a block diagram illustrating a functional configuration of an information processing system according to the first exemplary embodiment of the disclosure.

Referring to FIG. 5, the functional configuration of the information processing system 1 of the first exemplary embodiment is described below. FIG. 5 is a block diagram illustrating the functional configuration of the information processing system 1 of the first exemplary embodiment.

According to the first exemplary embodiment as illustrated in FIG. 5, the second server 30 includes a registering unit 31A and image forming apparatus 50 includes a setting unit 51A. The CPU 31 in the second server 30 functions as the registering unit 31A by executing the setting file production processing program 33A. The CPU 51 in the image forming apparatus 50 functions as the setting unit 51A by executing the setting file reflection processing program 53A.

If a setting item of a first setting file in a first target apparatus (any image forming apparatuses 50 in the first exemplary embodiment) and a corresponding item of a second setting file of a second target apparatus (another image forming apparatus 50 in the first exemplary embodiment) has the same setting information set, the registering unit 31A of the first exemplary embodiment registers the second setting file with reference information, referencing the setting information, as setting information at the setting item of the second setting file.

In the information processing system 1 of the first exemplary embodiment, the first server 10 as a cloud server stores (registers) the first setting file and second setting file.

If the second target apparatus is installed at any location, the setting unit 51A of the first exemplary embodiment sets a setting file of the second target apparatus by downloading the second setting file to the second target apparatus from the cloud server.

The setting unit 51A of the first exemplary embodiment sets the setting information by reading the setting information corresponding to the reference information in the setting file of the second target apparatus and replacing the reference information with the setting information. According to the first exemplary embodiment, the setting information corresponding to the reference information is acquired by reading the setting information from the setting file of the first target apparatus. The disclosure is not limited to this method. For example, the setting information corresponding to the reference information may be acquired by reading the setting information from the first setting file registered in the cloud server.

Referring to FIG. 6, the setting file database 13A of the first exemplary embodiment is described. FIG. 6 schematically illustrates a structure example of the setting file database 13A of the first exemplary embodiment.

The setting file described above is registered in the setting file database 13A. As illustrated in FIG. 6, device identification information and setting files are stored in an associated form in the setting file database 13A.

The device identification information is predetermined information and uniquely identifies each image forming apparatus 50 that is a target to be handled by the information processing system 1. According to the first exemplary embodiment, the device identification information includes but is not limited to a serial number of a corresponding image forming apparatus 50. For example, the device identification information may be an Internet protocol (IP) address of a corresponding image forming apparatus 50. For convenience of explanation, in the following discussion, only trailing alphabets "a," "b," "c." . . . of the corresponding image forming apparatus 50*a*, 50*b*, . . . are listed as illustrated in FIG. 6.

The setting file is a setting file set for the corresponding image forming apparatus 50 and includes setting information on a per setting item basis.

Referring to FIG. 6, the reference information for the setting information in the setting file is "Ref-(device identification information on a reference destination)." For example, if the reference destination of the reference information is the image forming apparatus 50*a*, the reference information is "Ref-a."

Referring to FIG. 6, setting information "12345" at setting item A is registered as the reference information in the setting file for the image forming apparatus 50*a* having the device identification information "a." For example, setting information "Ref-1" at setting item B is registered as the reference information in the setting file for the image forming apparatus 50*b* having the device identification information "b." In this case, information at setting item B in the setting file on the image forming apparatus 50*a* (information "3456" in FIG. 6) is set at setting item B in the setting file set on the image forming apparatus 50*b*.

The operation of the information processing system 1 of the first exemplary embodiment is described below with reference to FIGS. 7 through 12. For convenience of explanation, a test environment reproducing an environment at an installation location of the image forming apparatus 50 has been constructed using software on the second server 30.

Figure 7:
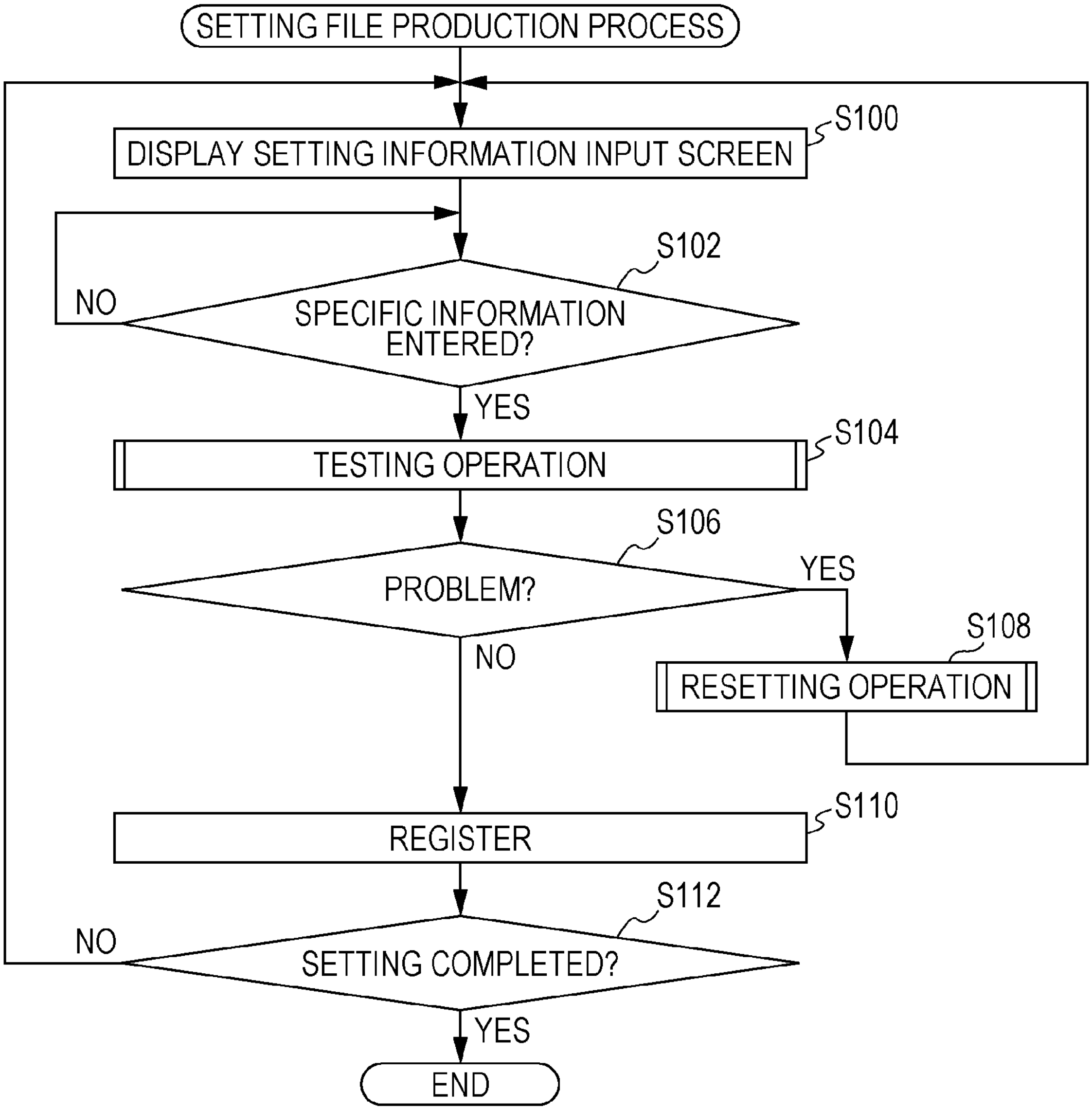
FIG. 7 is a flowchart illustrating an example of a setting file production process according to the first exemplary embodiment of the disclosure.

The operation of the second server 30 performing the setting file production process is described with reference to FIGS. 7 through 9. FIG. 7 is a flowchart illustrating an example of the setting file production process of the first exemplary embodiment.

When a creator of the setting file has entered an execution instruction via the input unit 34 in the second server 30 in the information processing system 1, the CPU 31 in the second server 30 executes the setting file production processing program 33A, thereby performing, for example, the setting file production process illustrated in FIG. 7. The creator may be a person in charge in the manufacturer of the image forming apparatus 50, a person of a dealer in charge of selling the image forming apparatus 50 or an installer who actually installs the image forming apparatus 50.

In step S100 in FIG. 7, the CPU 31 controls the display 35 such that a setting information input screen having a predetermined form is displayed. In step S102, the CPU 31 waits on standby until predetermined information has been entered. FIG. 8 illustrates an example of the setting information input screen of the first exemplary embodiment.

Figure 8:
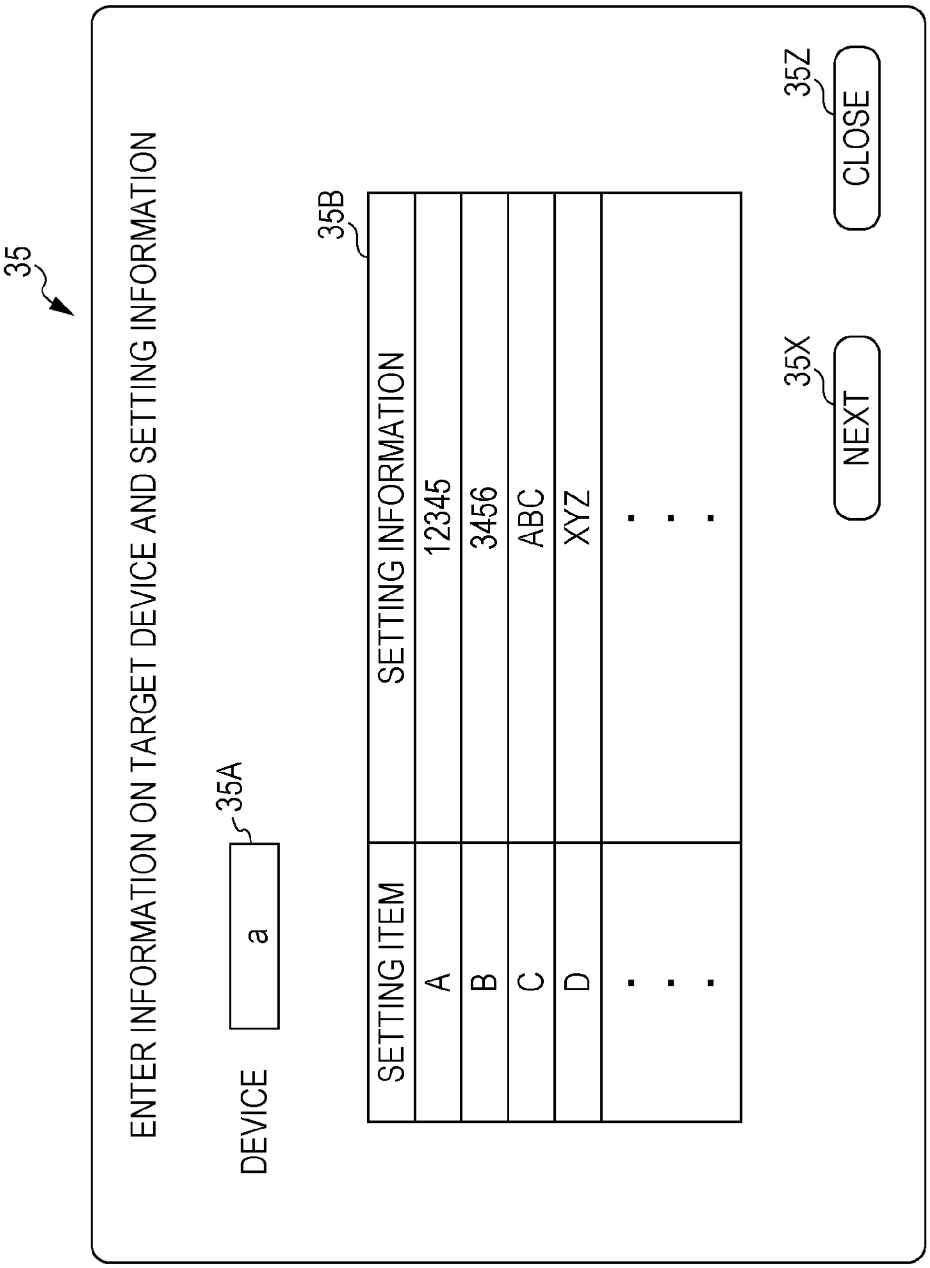
FIG. 8 illustrates an example of a setting information input screen according to the first and second exemplary embodiments of the disclosure.

Referring to FIG. 8, the setting information input screen displays a message prompting the creator to enter information on a target device and the setting information corresponding to the target device. The setting information input screen displays a device input region 35A that receives information indicating the device and setting information input region 35B that receives the setting information.

When the setting information input screen in FIG. 8 is displayed, the creator enters information indicating a target device (the device identification information in the first exemplary embodiment) in the device input region 35A while entering the setting information to be set on the device in the setting information input region 35B. The creator selects a next setting button 35X on the input unit 34 to continuously enter the setting information about another device or selects the closing button 35Z on the input unit 34 to end the inputting of the setting information. When the next setting button 35X or the closing button 35Z is selected by the creator, yes path is followed in step S102 and processing proceeds to step S104.

In step S104, the CPU 31 performs a predetermined testing operation. According to the first exemplary embodiment, a virtual apparatus (a simulator in the first exemplary embodiment) of the image forming apparatus 50 responsive to the setting information entered by the creator is used in the testing operation to verify whether the virtual apparatus works without any problem.

In step S106, the CPU 31 determines whether any problem occurs in the testing operation and if yes path is followed, processing proceeds to step S110. If no path is followed, processing proceeds to step S108.

In step S108, the CPU 31 performs a predetermined resetting operation and then returns to step S100. In the resetting operation in the first exemplary embodiment, information indicating to the creator that input setting information has a fault is displayed and the creator is thus prompted to re-input the setting item.

In step S110, the CPU 31 stores (registers) in the setting file database 13A the setting information free from any fault as a setting file together with input device identification information and then proceeds to step S112.

In step S112, the CPU 31 determines whether the creator has selected the closing button 35Z on the setting information input screen. If no path is followed, the CPU 31 returns to step S100. If yes path is followed, the CPU 31 completes the setting file production process. FIG. 9 illustrates an example of the setting information input screen when the setting information at the second and subsequent entries of the first exemplary embodiment is input.

Figure 9:
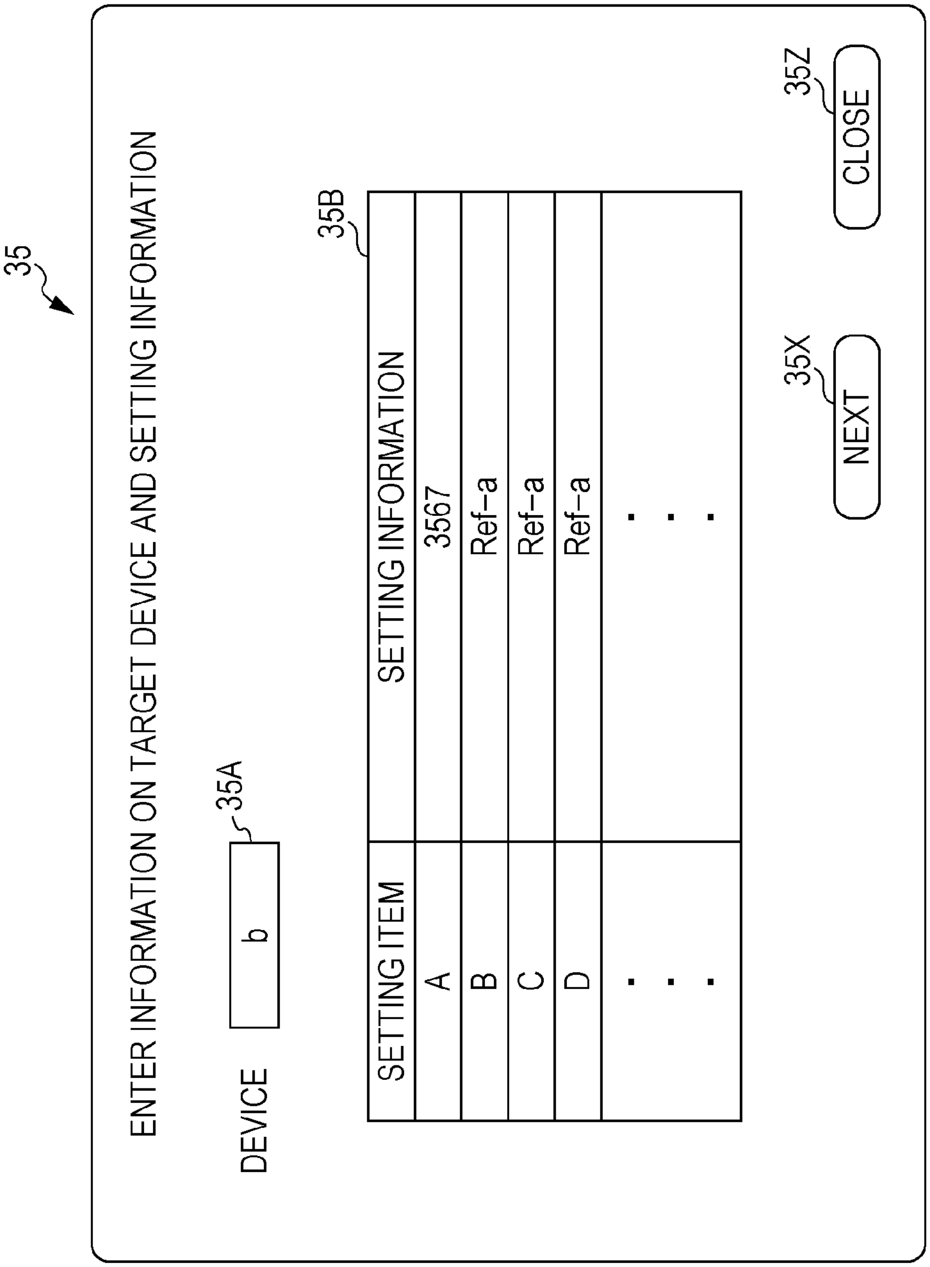
FIG. 9 is a front view illustrating an example of a setting information input screen when setting second and subsequent entries according to the first and second exemplary embodiments of the disclosure is entered.

Referring to FIG. 9, the creator enters on the setting information input screen the above-described reference information as the setting information at the setting item that references a setting item determined to be fault-free concerning the previously input setting information in the testing operation. FIG. 9 illustrates setting items B through D that have received the reference information indicating that the setting information at the same setting items of the image forming apparatus 50*a* is to be referenced.

If the operations in steps S100 through S108 are iterated and the reference information is included in the setting information, the CPU 31 verifies in the testing operation in step S104 whether the setting information at the reference destination indicated by the reference information is able to be correctly referenced.

The setting file database 13A illustrated in FIG. 6, for example, is constructed in the setting file production process as described above.

Figure 10:
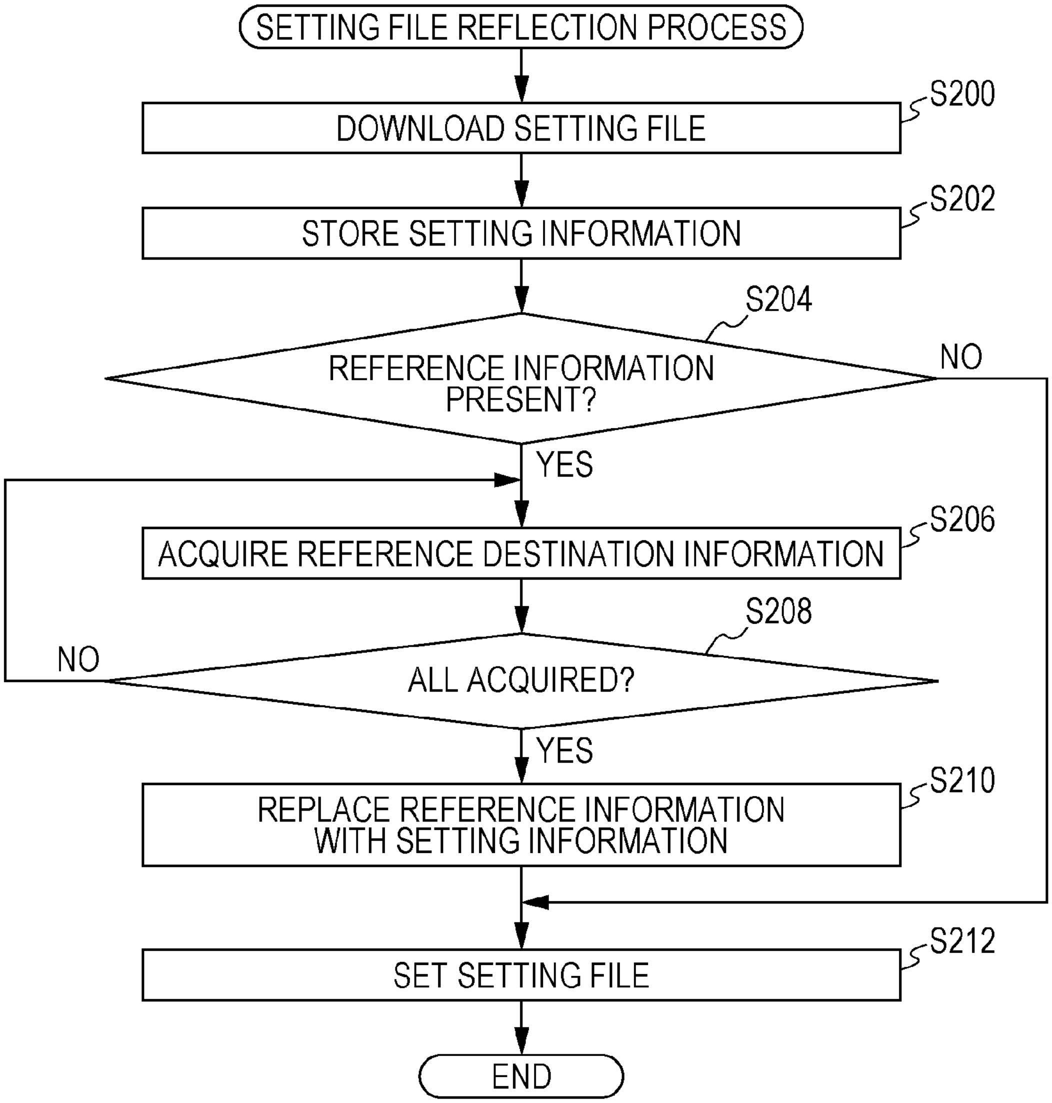
FIG. 10 is a flowchart illustrating an example of a setting file reflection process according to the first exemplary embodiment of the disclosure.

The operation of the image forming apparatus 50 in the setting file production process is described below with reference to FIG. 10. FIG. 10 is a flowchart illustrating an example of a setting file reflection process of the first exemplary embodiment.

In the information processing system 1 of the first exemplary embodiment, an installer completes a network setting with the image forming apparatus 50 (hereinafter referred to as a "target apparatus") installed at a target installation location and selects, using the input unit 54, a setting information reflection button (not illustrated) displayed on the display 55 in the target apparatus. When the CPU 51 in the target apparatus executes the setting file reflection processing program 53A, the setting file reflection process is performed as illustrated in FIG. 10. The method of starting performing the setting file reflection process is not limited to this method. For example, when the network setting is complete, the setting file reflection process may be automatically started or a person in charge of management of the image forming apparatus 50 other than the installer may provide an instruction to start performing the setting file reflection process.

In step S200 in FIG. 10, the CPU 51 downloads the setting file corresponding to the target apparatus from the setting file database 13A of the first server 10 and in step S202, the CPU 51 stores the setting information in the downloaded setting file in a predetermined memory region of the storage 53.

In step S204, the CPU 51 determines whether the setting information in the stored setting file includes the reference information. If no path is followed, the CPU 51 proceeds to step S212 or if yes path is followed, the CPU 51 proceeds to step S206.

In step S206, the CPU 51 acquires, from a reference destination indicated by a piece of the reference information determined as being included in the operation in step S204 (hereinafter referred to as "target reference information"), the setting information at a corresponding setting item.

The CPU 51 thus requests the image forming apparatus 50 serving as the reference destination to acquire the setting information as a reference target. In response to the request, the image forming apparatus 50 serving as the reference destination transmits the requested setting information to the image forming apparatus 50 as a requester. The CPU 51 acquires the setting information by receiving the transmitted setting information.

The CPU 51 determines whether the received setting information is settable on the image forming apparatus 50. If the CPU 51 does not determine that the received setting information is settable, the CPU 51 suspends the setting file reflection process and may notify the installer of the suspension of the setting file reflection process. The determination as to whether the setting information is settable is performed by referring to whether the received setting information supports a function of the target apparatus, such as a scan function, copy function or fax function.

The setting information serving as a reference target may be difficult to acquire because the image forming apparatus 50 as a reference destination is not operative or the setting of the setting file of the image forming apparatus 50 serving as the reference destination is not complete. A method of dealing with such a situation is described with reference to a third exemplary embodiment.

In step S208, the CPU 51 determines whether the acquisition of the setting information on the reference destination concerning all the target reference information is complete. If no path is followed, the CPU 51 returns to step S206 or if yes path is followed, the CPU 51 proceeds to step S210.

In step S210, the CPU 51 replaces the corresponding reference information stored in step S202 with setting information on all the reference destinations acquired in the operations in steps S206 through S208.

In step S212, the CPU 51 reads from the storage 53 the setting information having undergone the operations described above, sets the setting information as a setting file on the target apparatus and thus ends the setting file reflection process.

The setting file reflection process completes the setting of the setting file on the target apparatus. In the setting file reflection process of the first exemplary embodiment in this way, the setting information referenced when the image forming apparatus 50 is used is stored in a file form on the image forming apparatus 50. The disclosure is not limited to this method. For example, in an example, the setting information stored on the storage 53 through up to step S210 in the setting file reflection process may be used as the setting information that is referenced when the image forming apparatus 50 is used. In such an example, the reference destination indicated by the reference information is not the setting file but the setting information stored on the storage 53 in the corresponding image forming apparatus 50. In the technique related to the disclosure, the setting file set on the first target apparatus and second target apparatus refers to the "setting information" in a broad sense.

Figure 11:
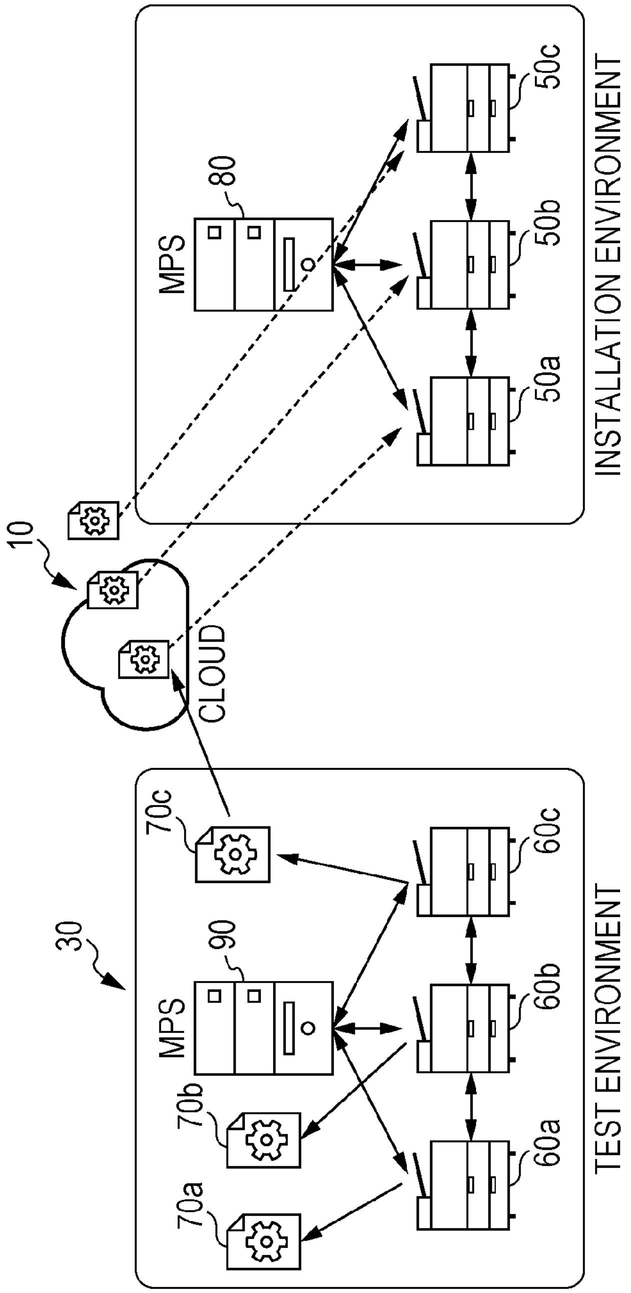
FIG. 11 schematically illustrates a registration status and setting status of a setting file in the information processing system according to the first exemplary embodiment of the disclosure.
Figure 12:
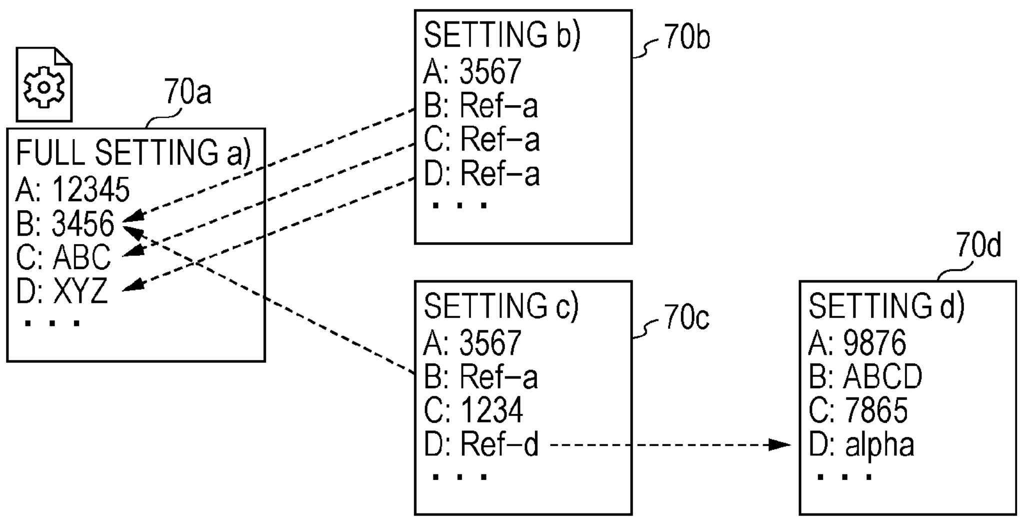
FIG. 12 schematically illustrates the setting status of the setting file in the information processing system according to the first exemplary embodiment of the disclosure.

The registration status and setting status of the setting file in the information processing system 1 of the first exemplary embodiment are described with reference to FIGS. 11 and 12. FIG. 11 schematically illustrates the registration status and setting status of the setting file in the information processing system 1. FIG. 12 schematically illustrates the setting status of the setting file in the information processing system 1.

Managed print service (MPS) 80 may be used in an environment (hereinafter referred to as an "installation environment") where multiple image forming apparatuses 50 are installed as illustrated in FIG. 11. MPS is a service that is suggested by manufacturers to reduce costs and improve productivity in the face of a duplication of functions of and an excess in the number of office automation (OA) devices, such as digital multi-function apparatuses. In an example as illustrated in FIG. 11, the test environment may include a virtual MPS 90 in addition to virtual apparatus 60*a*, 60*b*, . . . responsive to the image forming apparatuses 50, respectively. Each of virtual apparatus 60*a*, 60*b*, . . . , if not differentiated from each other, is representatively referred to as a "virtual apparatus 60."

Referring to FIG. 11, the creator inputs setting files 70*a*, 70*b*, . . . respectively corresponding to the image forming apparatuses 50 in the setting file production process of the first exemplary embodiment. The input setting files 70*a*, 70*b*, . . . are tested and then registered on the first server 10 serving as a cloud server. Each of the input setting files 70*a*, 70*b*, . . . , if not differentiated from each other, is representatively referred to as a "setting file 70."

When the installer actually installs the image forming apparatus 50 in the installation environment, the setting file reflection process is performed in response to an instruction from the installer and each image forming apparatus 50 is set with a corresponding setting file.

In the setting file reflection process of the first exemplary embodiment, the setting information at the reference destination indicated by the reference information is applied to the setting item with the reference information set therein as illustrated in FIG. 12. Referring to FIG. 12, for example, the setting information at corresponding setting items is applied to the setting items B. C and D in a setting file 70*b* of the image forming apparatus 50*b*. Similarly, referring to FIG. 12, the setting information at the setting item B in the setting file 70*a* is applied to a setting item B in the setting file 70*c* of the image forming apparatus 50*c* and the setting information at a setting item D in the setting file 70*d* is applied to a setting item D of the setting file 70*c*.

If the setting items having the reference information set therewithin in the second setting files of the second target apparatuses (the image forming apparatus 50*b* and image forming apparatus 50*c* in FIG. 12) in the information processing system 1 of the first exemplary embodiment have been tested with respect to the corresponding items in the first target apparatuses (the image forming apparatus 50*a* and image forming apparatus 50*b*), the production and testing are not performed at the setting items. This method saves time in the production and testing of the setting file in comparison with when the production and testing of the setting file are individually performed on each target apparatus.

Second Exemplary Embodiment

If the setting information at a reference destination indicated by the reference information for the setting information set by the creator is another piece of the reference information, the reference information may be a circular reference in which the setting information is difficult to reach. In a second exemplary embodiment of the disclosure, to deal with this situation, referencing through the reference information is inhibited. The whole configuration of the information processing system 1 of the second exemplary embodiment and the electrical configuration of each apparatus included in the information processing system 1 remain unchanged from those in the information processing system 1 of the first exemplary embodiment and the discussion of the whole configuration of the information processing system 1 and the electrical configuration of each apparatus in the information processing system 1 is omitted herein.

Figure 13:
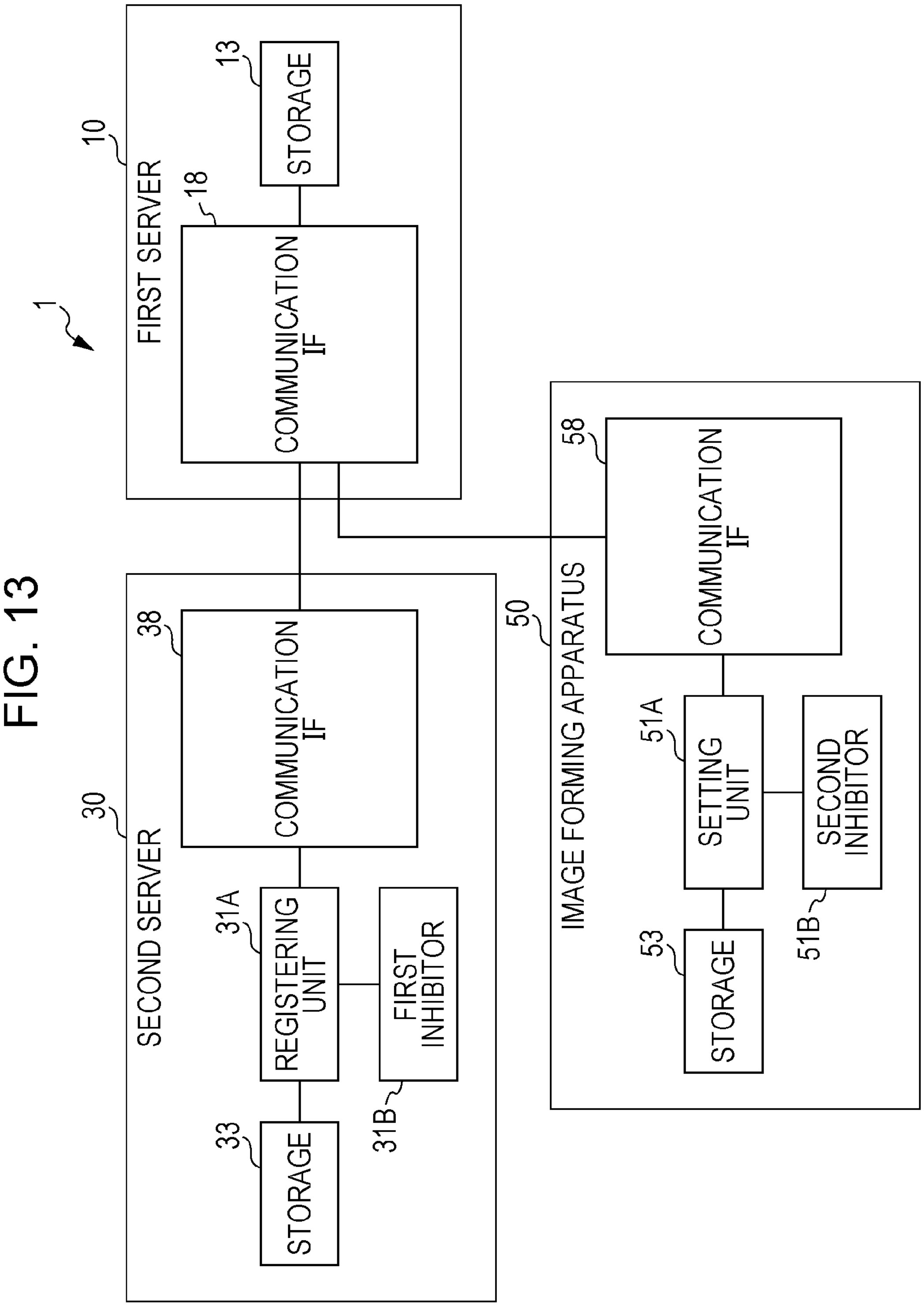
FIG. 13 is a block diagram illustrating an example of a functional configuration of the information processing system according to the second exemplary embodiment of the disclosure.

Referring to FIG. 13, a functional configuration of the information processing system 1 of the second exemplary embodiment is described. FIG. 13 is a block diagram illustrating an example of the functional configuration of the information processing system 1 of the second exemplary embodiment. In FIG. 13, elements identical to those in FIG. 5 are designated with the same reference numerals and the discussion thereof is omitted herein.

With reference to FIG. 13, in the information processing system 1 of the second exemplary embodiment, the second server 30 includes a first inhibitor 31B in addition to the registering unit 31A and the image forming apparatus 50 includes a second inhibitor 51B in addition to the setting unit 51A. The CPU 31 in the second server 30 functions as the registering unit 31A and first inhibitor 31B by executing the setting file production processing program 33A of the second exemplary embodiment described below. The CPU 51 in the image forming apparatus 50 functions as the setting unit 51A and second inhibitor 51B by executing the setting file reflection processing program 53A.

The first inhibitor 31B and second inhibitor 51B of the second exemplary embodiment inhibit the setting information at the reference destination referenced by the reference information from being another piece of the reference information. In particular, if the setting information at the reference destination referenced by the reference information is another piece of the reference information when the replacement is performed, the second inhibitor 51B provides a notification that the reference information is illegal.

The operation of the information processing system 1 of the second exemplary embodiment is described with reference to FIGS. 14 through 17. For convenience of explanation, a test environment reproducing an environment at an installation location of the image forming apparatus 50 has been constructed using software on the second server 30.

Figure 14:
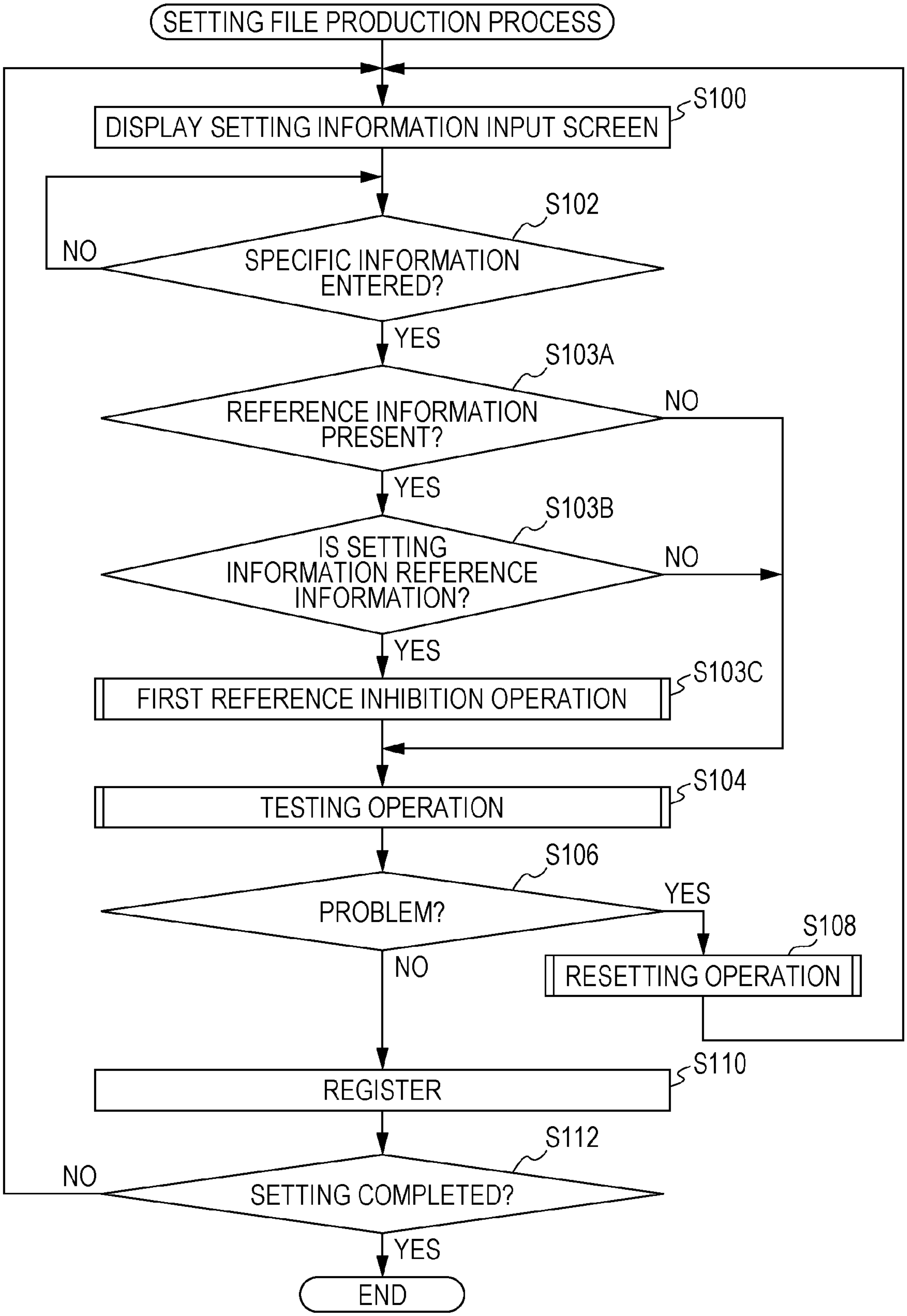
FIG. 14 is a flowchart illustrating an example of a setting file production process according to the second exemplary embodiment of the disclosure.
Figure 15:
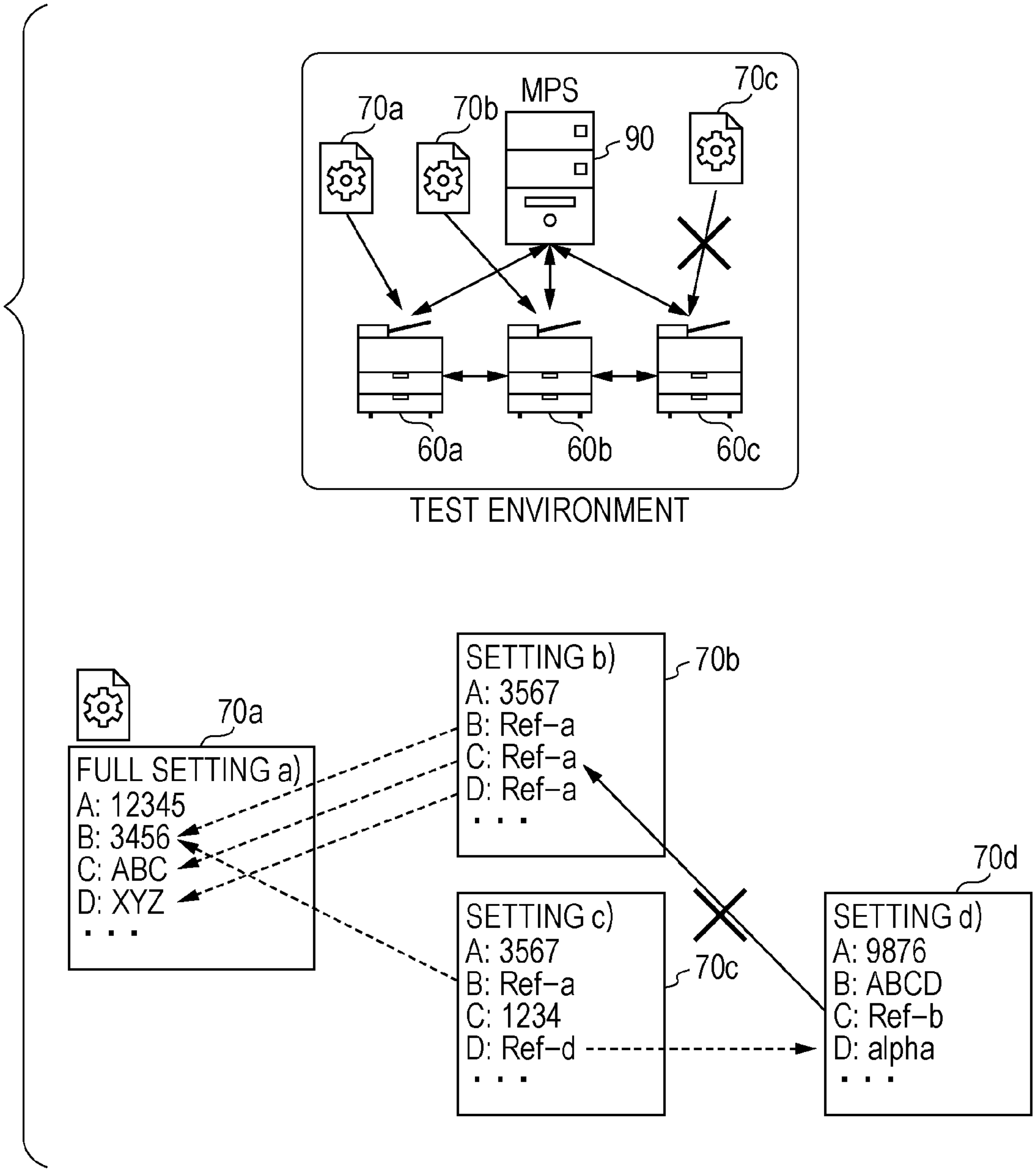
FIG. 15 schematically illustrates a registration status of the setting file in the information processing system according to the second exemplary embodiment of the disclosure.

The operation of the second server 30 in the setting file production process is described below with reference to FIGS. 14 through 15. FIG. 14 is a flowchart illustrating an example of the setting file production process according to the second exemplary embodiment. FIG. 15 schematically illustrates a registration status of the setting file in the information processing system 1 according to the second exemplary embodiment. Steps in FIG. 14 designated with the same step numbers as in FIG. 7 perform the same operations and the discussion thereof is omitted herein.

When the creator of the setting file enters an execution instruction via the input unit 34 in the second server 30, the CPU 31 in the second server 30 executes the setting file production processing program 33A, thereby performing, for example, the setting file production process illustrated in FIG. 14.

In step S103A in FIG. 14, the CPU 31 determines whether the reference information is included in the setting information input on the setting information input screen. If no path is followed, the CPU 31 proceeds to step S104 or if yes path is followed, the CPU 31 proceeds to step S103B.

In step S103B, the CPU 31 acquires the reference information determined as being included in the operation in step S103A by reading from the setting file database 13A the setting information at the reference destination indicated by the reference information. The CPU 31 determines whether the reference information is included in the acquired setting information at the reference destination. If no path is followed, the CPU 31 proceeds to step S104 or if yes path is followed, the CPU 31 proceeds to step S103C.

In step S103C, the CPU 31 performs a predetermined first reference inhibition operation and then proceeds to step S104.

If the reference destination indicated by the reference information in the input setting information is the reference information, there is a possibility that the reference information leads to a circular reference. According to the second exemplary embodiment, the first reference inhibition operation displays, to the creator, information on process suspension (hereinafter referred to as "process suspension information") on the display 35. In the first reference inhibition operation, the creator restarts process when the setting information is corrected in response to the displaying of the process suspension information.

As illustrated in FIG. 15, the first reference inhibition operation may reduce the possibility that a circular reference of the setting information occurs in the test environment. FIG. 15 illustrates an example in which the setting information at a setting item C of the setting file on the image forming apparatus 50*b* that serves as a reference destination of the reference information input at a setting item C at the setting file on the image forming apparatus 50*d* is further the reference information that references the setting information on the image forming apparatus 50*a*.

Even if the possibility of the circular reference in the test environment is reduced, a circular reference may still occur in an installation environment because of a change in the installation environment or a modification in the setting information by a manager on an installed image forming apparatus 50. The information processing system 1 of the second exemplary embodiment performs again an operation to inhibit the circular reference in the setting file reflection process.

Figure 16:
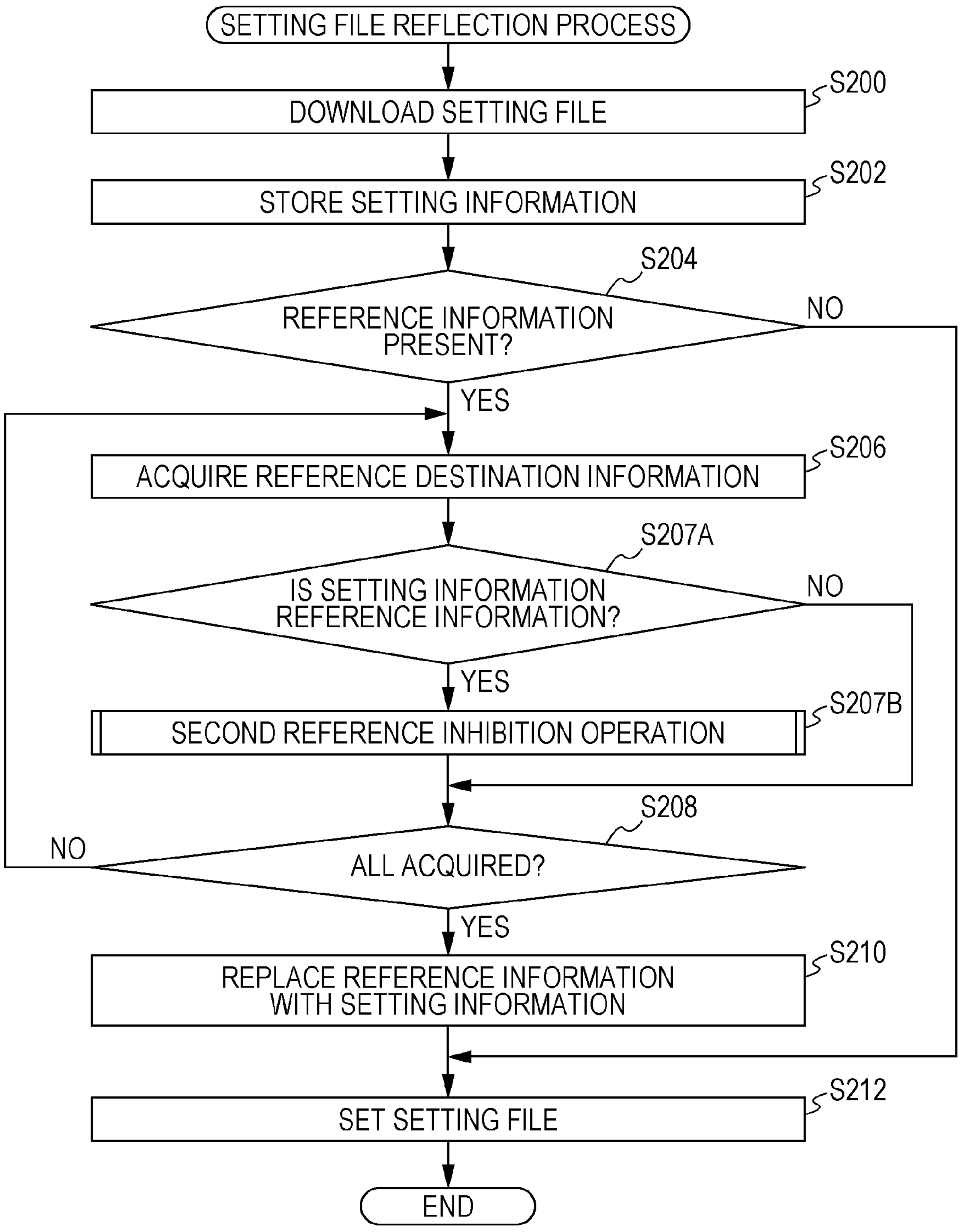
FIG. 16 is a flowchart illustrating an example of a setting file reflection process according to the second exemplary embodiment of the disclosure.
Figure 17:
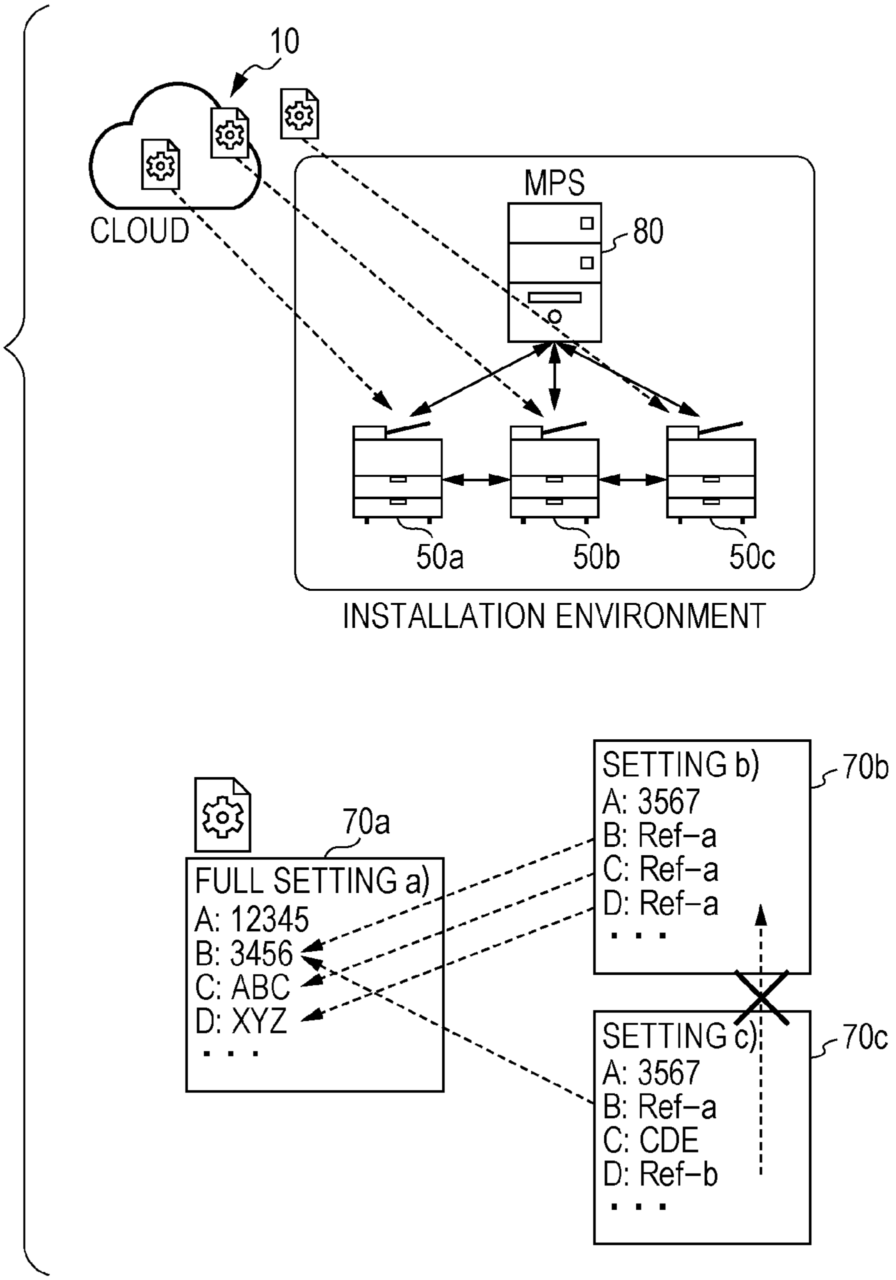
FIG. 17 schematically illustrates a setting status of the setting file in the information processing system according to the second exemplary embodiment of the disclosure.

The operation of the image forming apparatus 50 in the setting file reflection process of the second exemplary embodiment is described below with reference to FIGS. 16 and 17. FIG. 16 is a flowchart illustrating an example of the setting file reflection process of the second exemplary embodiment. FIG. 17 schematically illustrates a setting status of the setting information in the information processing system 1 of the second exemplary embodiment. Steps in FIG. 16 designated with the same step numbers as in FIG. 10 perform the same operations and the discussion thereof is omitted herein.

In the information processing system 1 of the second exemplary embodiment, the installer completes a network setting with the image forming apparatus 50 (a target apparatus) installed at a target installation location and selects, using the input unit 54, a setting information reflection button displayed on the display 55 in the target apparatus. When the CPU 51 in the target apparatus executes the setting file reflection processing program 53A, the setting file reflection process illustrated in FIG. 16, for example, is performed.

In step S207A in FIG. 16, the CPU 51 determines whether the setting information acquired in the operation in step S206 is the reference information. If no path is followed, the CPU 51 proceeds to step S208 or if yes path is followed, the CPU 51 proceeds to step S207B.

In step S207B, the CPU 51 performs a predetermined second reference inhibition operation and then proceeds to step S208.

If the setting information on the installed image forming apparatus 50 includes the reference information indicating the reference destination, there is a possibility that the reference information leads to a circular reference. According to the second exemplary embodiment, the second reference inhibition operation displays, to the creator, the process suspension information on the display 55. In the second reference inhibition operation, the creator restarts process when the setting information is corrected in response to the displaying of the process suspension information.

As illustrated in FIG. 17, the second reference inhibition operation may reduce the possibility that a circular reference of the setting information occurs in the installation environment. FIG. 17 illustrates an example in which the setting information at a setting item D in the setting file on the image forming apparatus 50*b* that serves as a reference destination of the reference information input at a setting item D in the setting file on the image forming apparatus 50*c* is further the reference information that references the setting information on the image forming apparatus 50*a*.

Third Exemplary Embodiment

The reference destination indicated by the reference information in the setting file may not be accessible for some reason. For example, the image forming apparatus 50 is not operating or the setting of the setting file on the image forming apparatus 50 serving as the reference destination is not completed. A method of dealing with such a situation is described with reference to a third exemplary embodiment.

Figure 18:
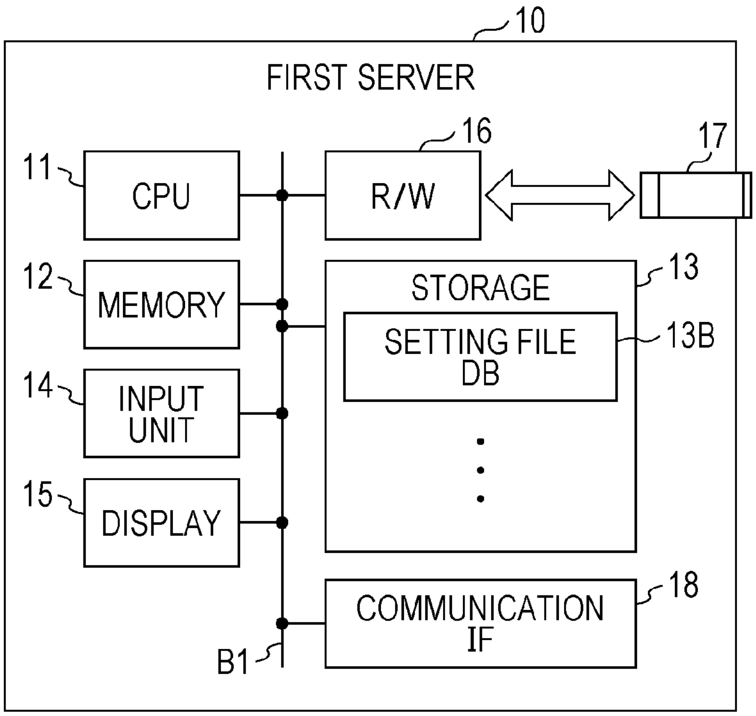
FIG. 18 is a block diagram illustrating an example of an electrical configuration of a first server according to third and fourth exemplary embodiments of the disclosure.

The whole configuration of the information processing system 1 of the third exemplary embodiment is identical to the whole configuration of the information processing system 1 of the first exemplary embodiment. The electrical configuration of each apparatus included in the information processing system 1 identical to the electrical configuration of each apparatus included in the information processing system 1 except the electrical configuration of the first server 10. The configuration of the first server 10 of the third exemplary embodiment is described with reference to FIG. 18. FIG. 18 is a block diagram illustrating an example of the electrical configuration of the first server 10 of the third exemplary embodiment. Elements in FIG. 18 respectively identical to those in the first server 10 of the first exemplary embodiment in FIG. 2 are designated with the same reference numerals and the discussion thereof is omitted herein.

The first server 10 of the third exemplary embodiment in FIG. 18 is different from the first server 10 of the first exemplary embodiment in that the storage 13 includes a setting file database 13B different from the setting file database 13A.

Figure 19:
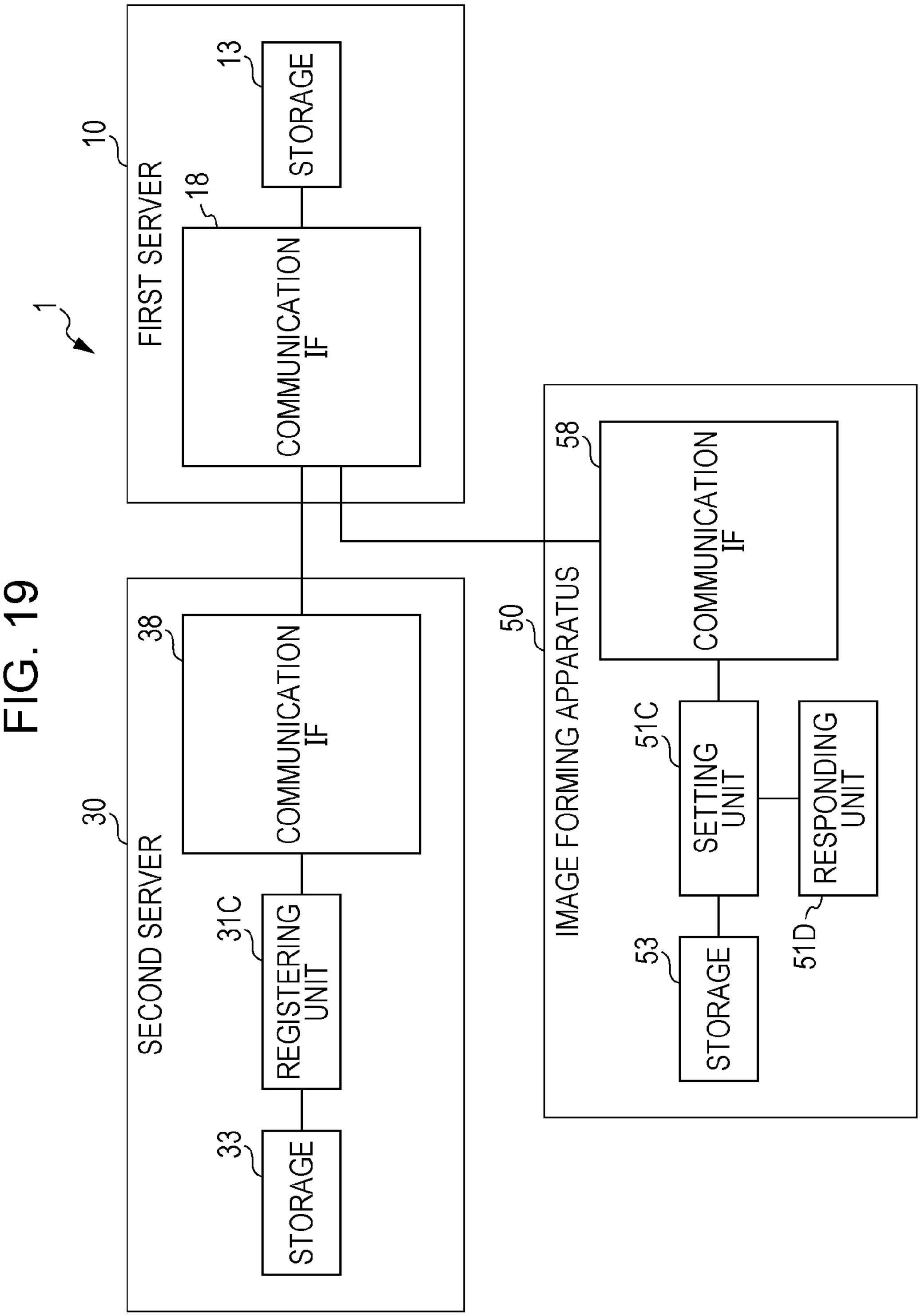
FIG. 19 is a block diagram illustrating an example of a functional configuration of an information processing system according to the third and fourth exemplary embodiments of the disclosure.

Referring to FIG. 19, the functional configuration of the information processing system 1 of the third exemplary embodiment is described below. FIG. 19 is a block diagram illustrating an example of the functional configuration of the information processing system 1 of the third exemplary embodiment. Elements in FIG. 19 respectively identical to those in in FIG. 5 are designated with the same reference numerals and the discussion thereof is omitted herein.

The information processing system 1 of the third exemplary embodiment in FIG. 19 is different from the information processing system 1 of the first exemplary embodiment in that the second server 30 includes a registering unit 31C different in process contents from the registering unit 31A of the first exemplary embodiment. The information processing system 1 of the third exemplary embodiment is different from the information processing system 1 of the first exemplary embodiment in that the image forming apparatus 50 includes a setting unit 51C different in process contents from the setting unit 51A of the first exemplary embodiment and a new responding unit 51D. The CPU 31 in the second server 30 functions as the registering unit 31C by executing the setting file production processing program 33A of the third exemplary embodiment. The CPU 51 in the image forming apparatus 50 functions as the setting unit 51C and responding unit 51D by executing the setting file reflection processing program 53A of the third exemplary embodiment.

The setting unit 51C continuously stores the reference information after the replacement of the reference information.

If the setting information referenced by the reference information is unable to be applied, the responding unit 51D suspends the operation of using the setting information and notifies the user of the suspension of the operation. In this way, according to the third exemplary embodiment, if the setting information referenced by the reference information is unable to be applied, the responding unit 51D suspends the operation of using the setting information and notifies the user of the suspension of the operation. The disclosure is not limited to this method. For example, the responding unit 51D may perform either suspends the operation of using the setting information or notifies the user of the suspension of the operation.

The registering unit 31C registers, in an associated form, reference information and default information on the setting information corresponding to the reference information. If the replacement is difficult, the setting unit 51C replaces the reference information with the default information associated with the corresponding reference information.

If the setting information corresponding to the reference information is difficult to read, the registering unit 31C registers, in an associated form, the reference information and instruction information indicating an instruction to attempt to read the setting information at a predetermined timing. The setting unit 51C attempts to read the setting information at the predetermined timing.

The setting file database 13B of the third exemplary embodiment is described with reference to FIG. 20. FIG. 20 schematically illustrates a structure example of a setting file database 13B of the third exemplary embodiment.

Referring to FIG. 20, the setting file database 13B of the third exemplary embodiment is different from the setting file database 13A of the first exemplary embodiment in that the default information is registered on each piece of the setting information set in the setting file.

The operation of the information processing system 1 of the third exemplary embodiment is described below with reference to FIGS. 21 through 24.

Figure 21:
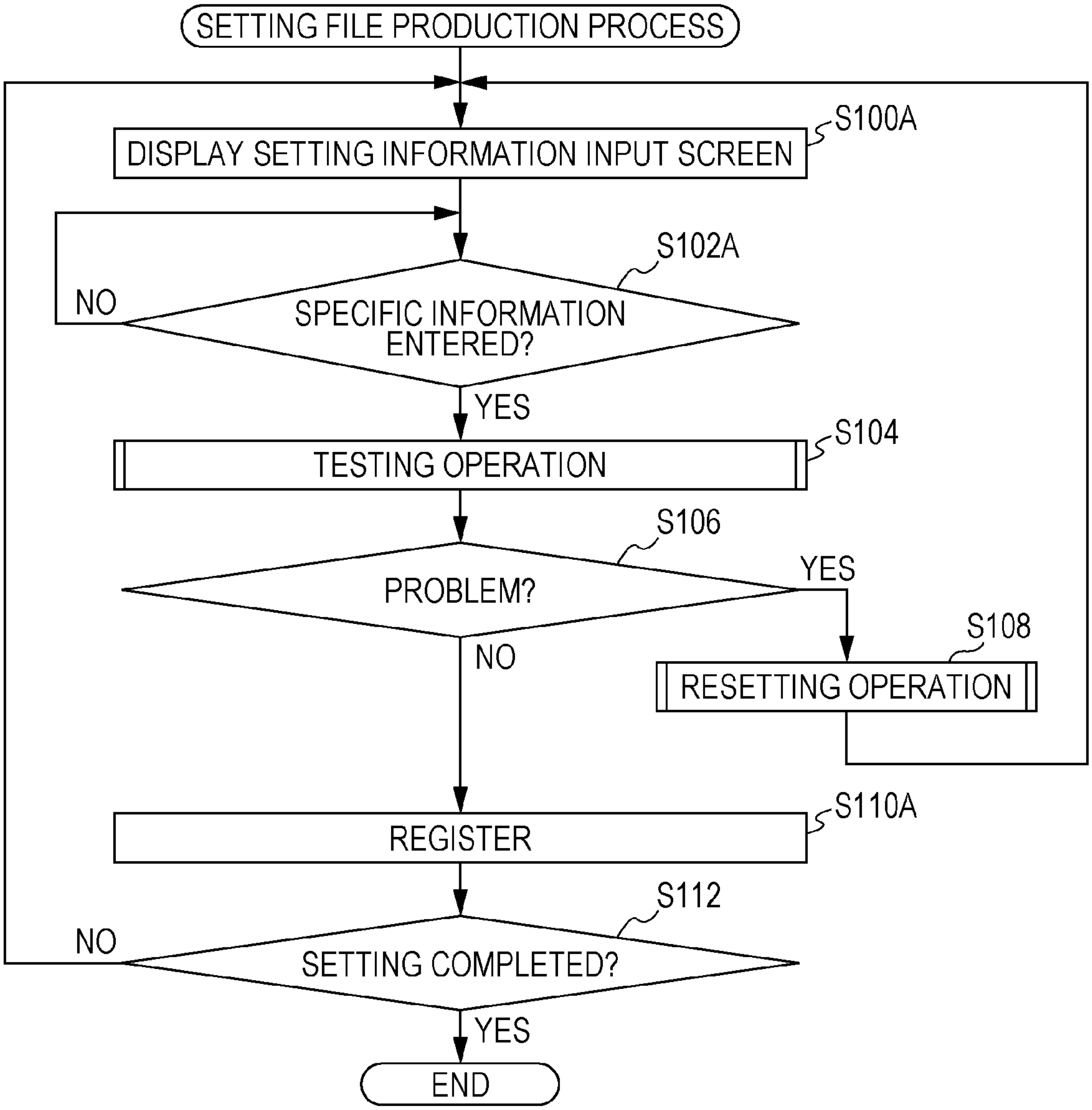
FIG. 21 is a flowchart illustrating an example of a setting file production process according to the third and fourth exemplary embodiments of the disclosure.
Figure 22:
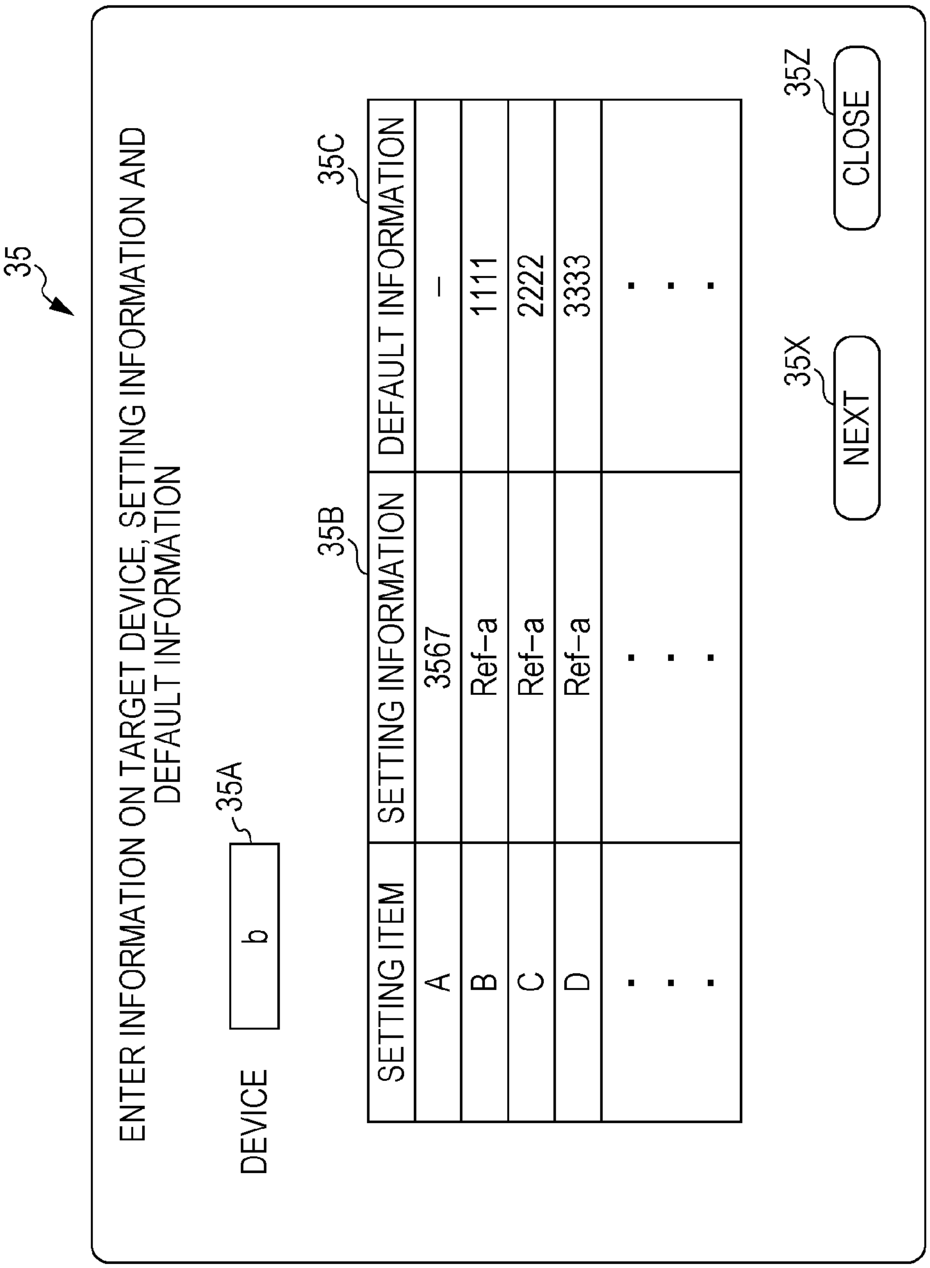
FIG. 22 is a front view illustrating an example of a setting information input screen according to the third and fourth exemplary embodiments of the disclosure.

The operation of the second server 30 in the setting file production process is described below with reference to FIGS. 21 and 22. FIG. 21 is a flowchart illustrating an example of the setting file production process of the third exemplary embodiment. FIG. 22 is a front view illustrating an example of the setting information input screen of the third exemplary embodiment. Steps in FIG. 21 designated with the same step numbers as in FIG. 7 perform the same operations and the discussion thereof is omitted herein.

When a creator of the setting file has entered an execution instruction via the input unit 34 in the second server 30 in the information processing system 1, the CPU 31 in the second server 30 executes the setting file production processing program 33A, thereby performing, for example, the setting file production process illustrated in FIG. 21.

In step S100A in FIG. 21, the CPU 31 controls the display 35 such that a setting information input screen having a predetermined form is displayed. In step S102A, the CPU 31 waits on standby until predetermined information has been entered.

Referring to FIG. 22, the setting information input screen of the third exemplary embodiment displays a message that prompts the creator to enter information on a target apparatus, the setting information on the apparatus and default information. The setting information input screen displays the device input region 35A used to enter the information on the apparatus, setting information input region 35B used to enter the setting information and default information input region 35C used to enter the default information.

When the setting information input screen in FIG. 22 is displayed, the creator enters information indicating the target apparatus (the device identification information in the third exemplary embodiment) on the device input region 35A and information indicating the setting information to be set on the apparatus on the setting information input region 35B. If the reference information is entered as the setting information, the creator further enters the default information on the corresponding setting information on the default information input region 35C. The creator selects the next setting button 35X via the input unit 34 to successively enter the setting information on another apparatus or selects the closing button 35Z via the input unit 34 to end the inputting of the setting information. If the next setting button 35X or the closing button 35Z is selected by the creator, yes path is followed in step S102A and processing proceeds to step S104.

In step S110A at a later operation, the CPU 31 stores in the setting file database 13B the entered device identification information and the setting information serving as a setting file and having undergone the operations described above and proceeds to step S112. If the default information is entered, the CPU 31 also stores in the setting file database 13B the default information in association with the corresponding reference information.

Figure 23:
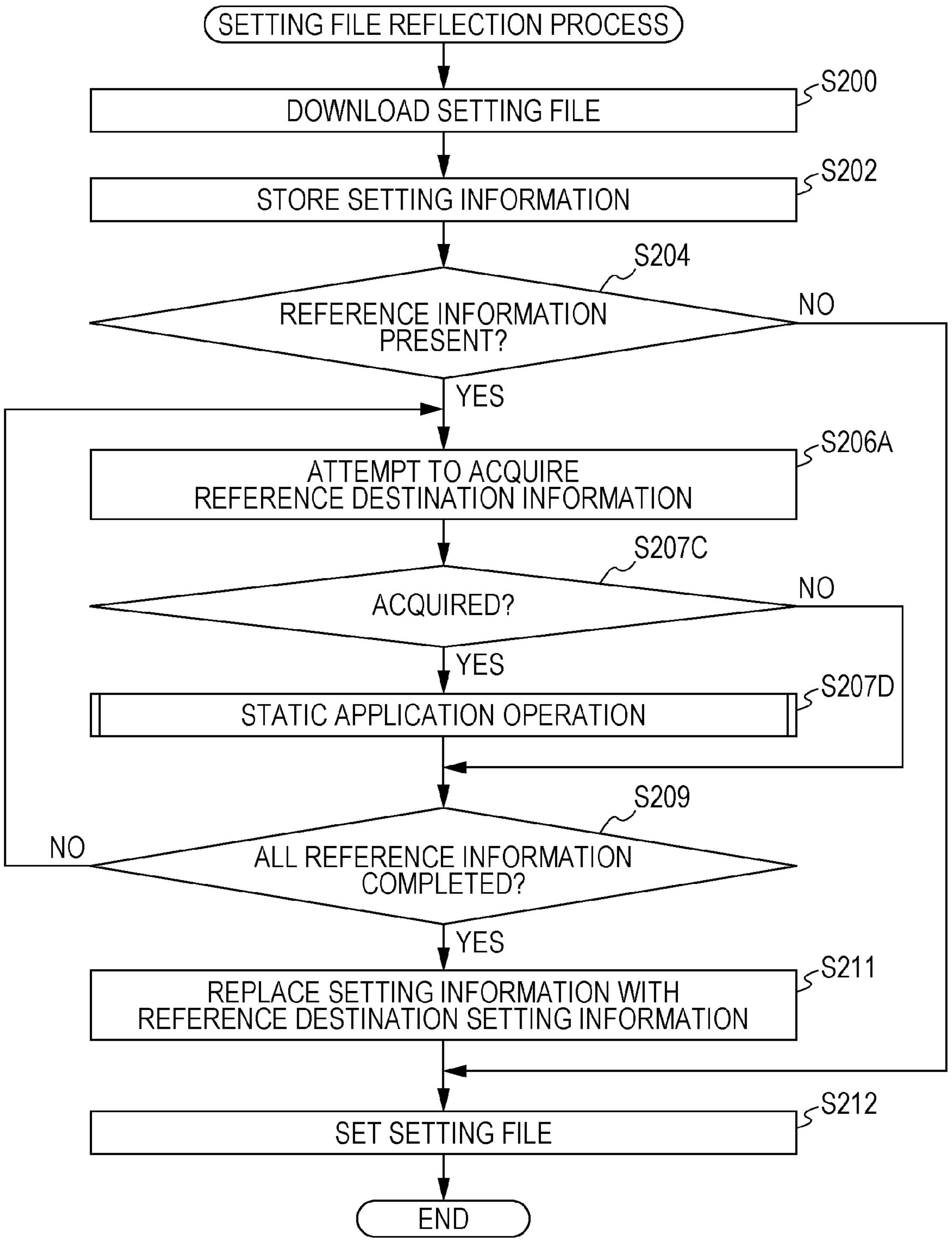
FIG. 23 is a flowchart illustrating an example of a setting file reflection process of the third exemplary embodiment of the disclosure.
Figure 24:
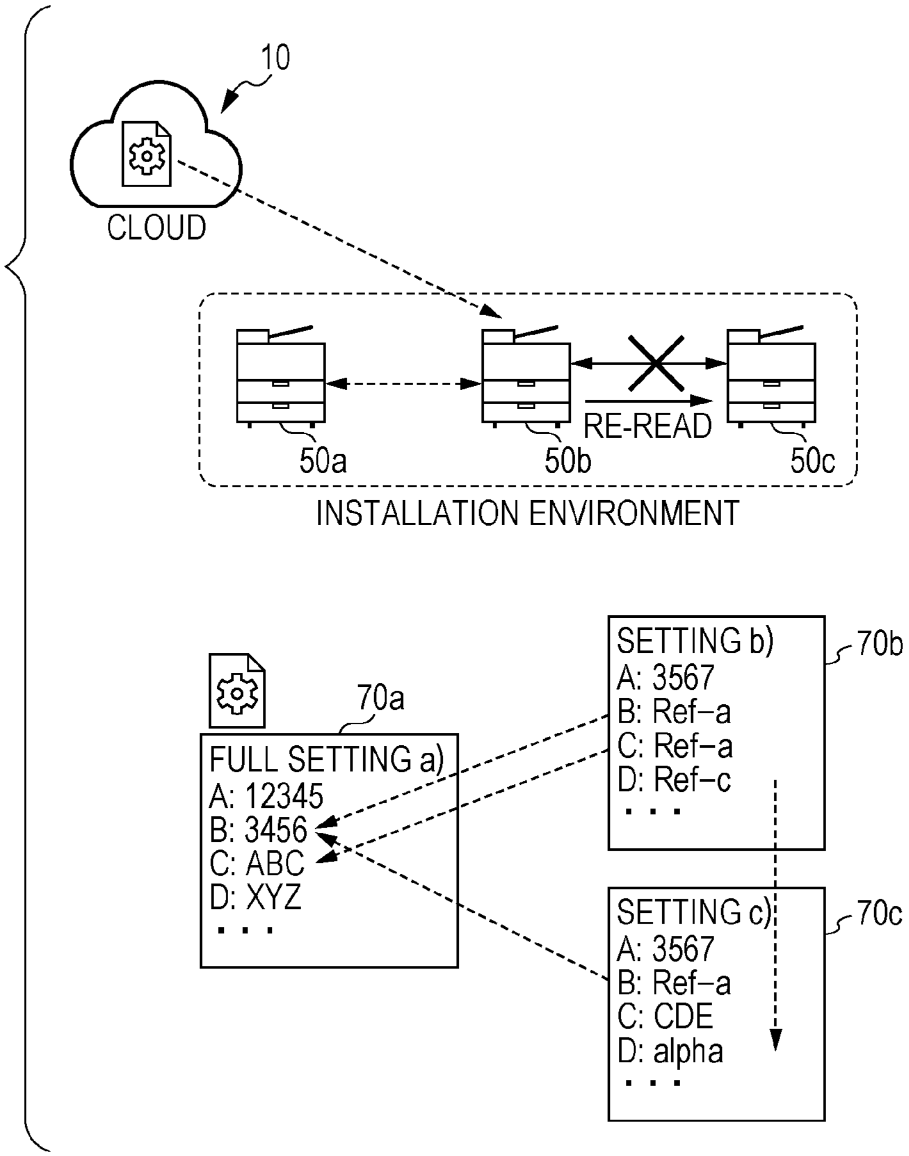
FIG. 24 schematically illustrates a setting status of the setting file in the information processing system according to the third exemplary embodiment of the disclosure.

The operation of the image forming apparatus 50 in the setting file reflection process of the third exemplary embodiment is described with reference to FIGS. 23 and 24. FIG. 23 is a flowchart illustrating an example of the setting file reflection process of the third exemplary embodiment. FIG. 24 schematically illustrates a setting status of the setting file in the information processing system 1 of the third exemplary embodiment. Steps in FIG. 23 designated with the same step numbers as in FIG. 10 perform the same operations and the discussion thereof is omitted herein.

In the information processing system 1 of the third exemplary embodiment, the installer completes a network setting with the image forming apparatus 50 (a target apparatus) installed at a target installation location and selects, using the input unit 54, a setting information reflection button displayed on the display 55 in the target apparatus. When the CPU 51 in the target apparatus executes the setting file reflection processing program 53A, the setting file reflection process illustrated in FIG. 23, for example, is performed.

In step S206A in FIG. 23, the CPU 51 acquires, from the reference destination indicated by the reference information as a piece of the target reference information that is determined as being included in the operation in step S204, the setting information at the corresponding setting item.

In step S207C, the CPU 51 determines whether the setting information has been acquired in the operation in step S206A. If no path is followed, the CPU 51 proceeds to step S209 or if yes path is followed, the CPU 51 proceeds to step S207D. It is noted that the reference information indicating a reference destination from which the setting information is unable to be acquired is referred to as "access disabled reference information."

In step S207D, the CPU 51 performs a predetermined static application operation. The static application operation of the third exemplary embodiment is described below.

The CPU 51 reads from the setting file database 13B the default information at the setting item corresponding to the setting information that is not acquired and replaces the access disabled reference information with the read default information. In this case, the CPU 51 does not delete but continuously stores the access disabled reference information.

The CPU 51 suspends an operation of using the setting information corresponding to the access disabled reference information and notifies the installer of information indicating the suspension of the operation. Through the notification, the CPU 51 may allow the installer to determine whether to continuously use the image forming apparatus 50. For example, if color setting is not correctly set in printing and monochrome printing is still acceptable, the image forming apparatus 50 may be continuously used. If user authentication or billing setting is not correctly set, the use of the target apparatus is inhibited.

At a predetermined timing, the CPU 51 registers, in an associated form, the access disabled reference information and the instruction information indicating an instruction to attempt to read the setting information at the reference destination indicated by the access disabled reference information.

Through the registration of the instruction information, at the predetermined timing, the setting unit 51C of the third exemplary embodiment attempts to read the setting information at the reference destination indicated by the access disabled reference information as illustrated in FIG. 24. If the setting information is successfully read, the CPU 51 replace the default information corresponding to the access disabled reference information with the read setting information. When the reference destination indicated by the access disabled reference information becomes inaccessible through this operation, the setting information corresponding to the access disabled reference information may be set.

In step S209, the CPU 51 determines whether all the target reference information has undergone the operations in steps S206A through S207D. If no path is followed, the CPU 51 returns to step S206A or if yes path is followed, the CPU 51 proceeds to step S211.

In step S211, the CPU 51 replaces the setting information stored in the operation in step S202 with the setting information at the reference destinations of all the setting items acquired in the operations in steps S206A through S209.

Fourth Exemplary Embodiment

In a fourth exemplary embodiment described below, the responding unit 51D applies the setting information referenced by the reference information when the second target apparatus applies the setting information at the setting file with the setting information accompanied by the reference information.

The whole configuration of the information processing system 1 of the fourth exemplary embodiment and the electrical configuration of each apparatus included in the information processing system 1 remain unchanged from those in the information processing system 1 of the third exemplary embodiment and are not discussed herein. The operation of the information processing system 1 of the fourth exemplary embodiment is also identical to the information processing system 1 of the third exemplary embodiment except the setting file reflection process.

Figure 25:
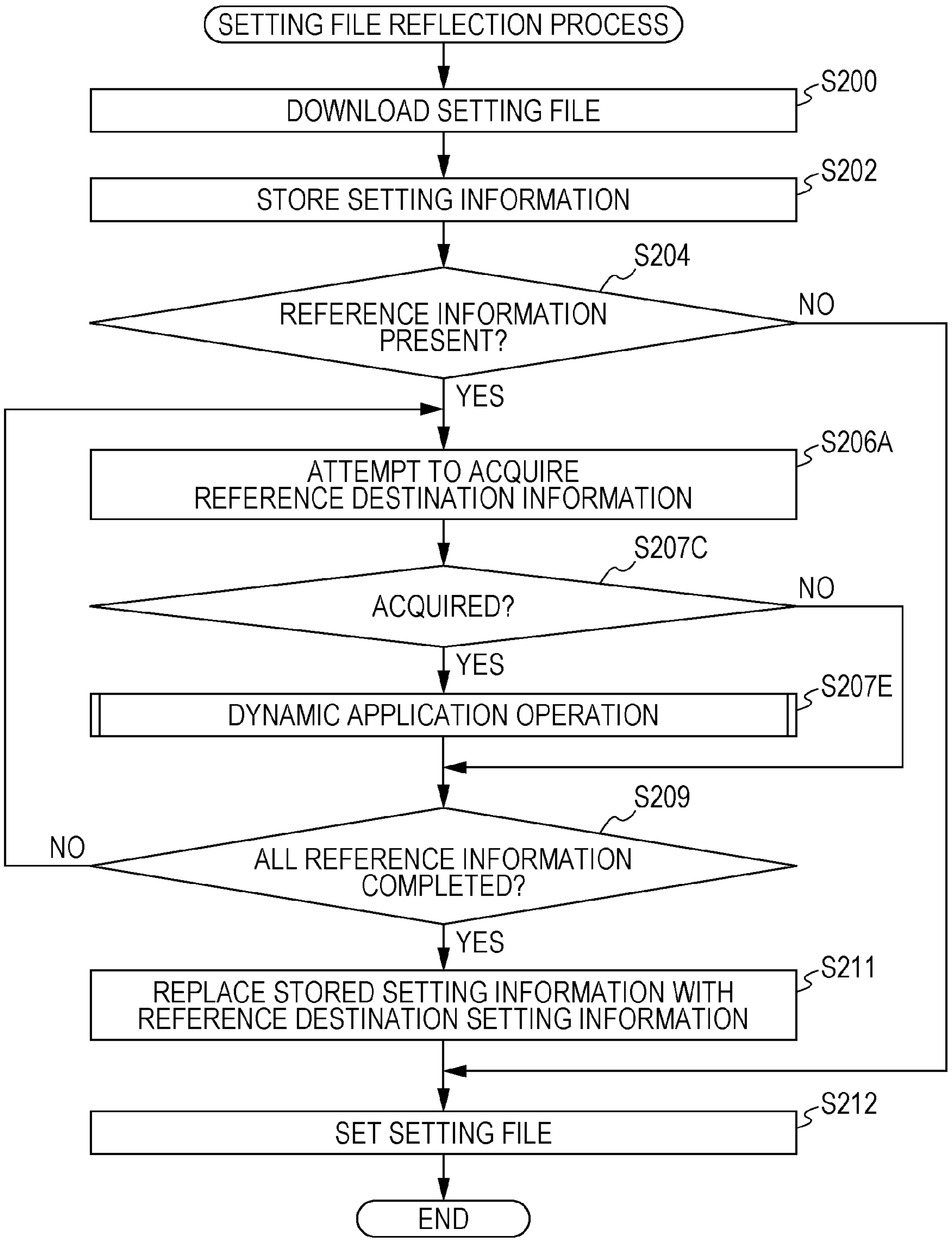
FIG. 25 is a flowchart illustrating an example of a setting file reflection process according to the fourth exemplary embodiment of the disclosure.
Figure 26:
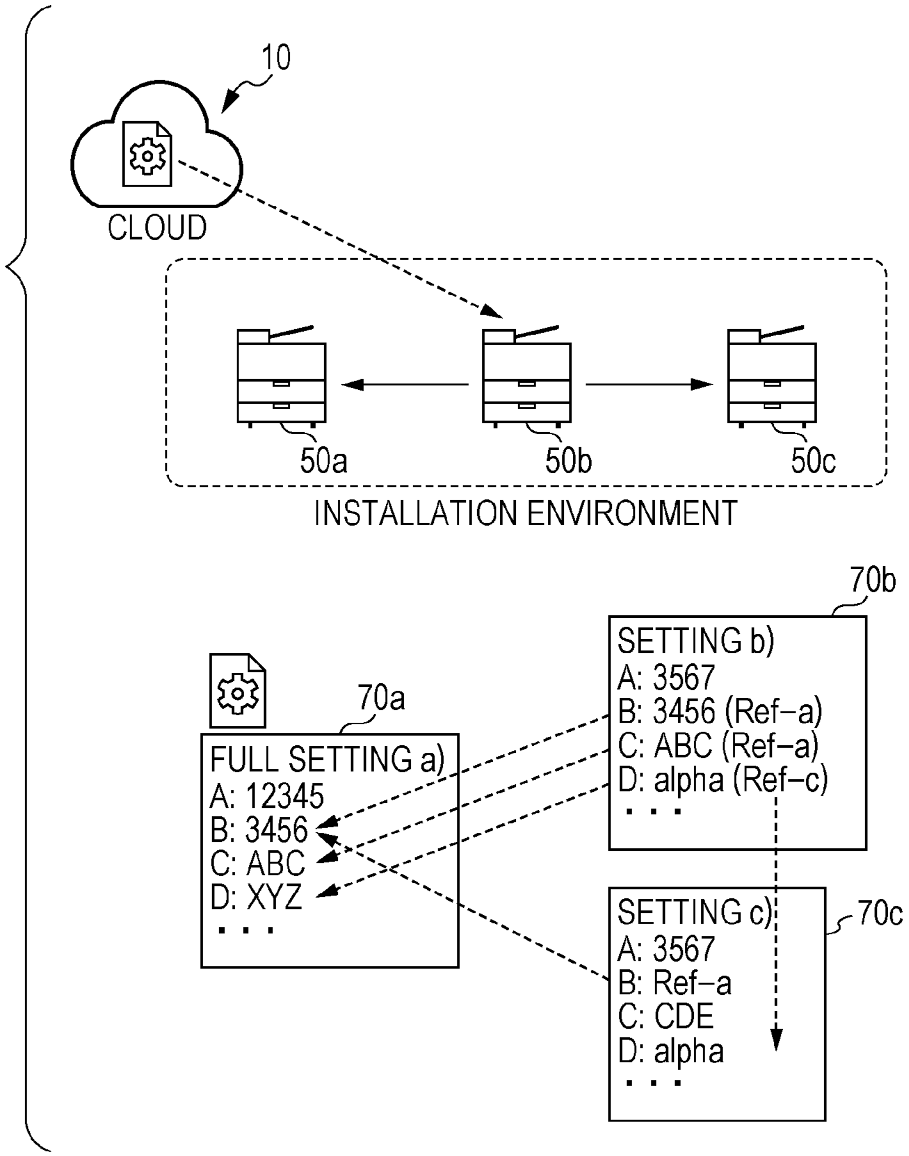
FIG. 26 schematically illustrates a setting status of the setting file in the information processing system according to the fourth exemplary embodiment of the disclosure.

The operation of the image forming apparatus 50 in the information processing system 1 of the fourth exemplary embodiment in the setting file reflection process is described below with reference to FIGS. 25 and 26. FIG. 25 is a flowchart illustrating an example of the setting file reflection process of the fourth exemplary embodiment. FIG. 26 schematically illustrates a setting status of the setting file in the information processing system 1 of the fourth exemplary embodiment. Steps in FIG. 25 designated with the same step numbers as in FIG. 23 perform the same operations and the discussion thereof is omitted herein.

In the information processing system 1 of the fourth exemplary embodiment, the installer completes a network setting with the image forming apparatus 50 (a target apparatus) installed at a target installation location and selects, using the input unit 54, a setting information reflection button displayed on the display 55 in the target apparatus. When the CPU 51 in the target apparatus executes the setting file reflection processing program 53A, the setting file reflection process illustrated in FIG. 25, for example, is performed.

In step S207E in FIG. 25, the CPU 51 performs a predetermined dynamic application operation. The dynamic application operation of the fourth exemplary embodiment is described below.

The CPU 51 reads from the setting file database 13B the default information at the setting item corresponding to the setting information that is not acquired and then replaces the access disabled reference information with the read default information. In this case, the CPU 51 does not delete the access disabled reference information but continuously stores the access disabled reference information, for example, as illustrated in FIG. 26.

If the setting information having the access disabled reference information is applied during operation performed on the image forming apparatus 50 by the user, the CPU 51 in the image forming apparatus 50 acquires the setting information at the reference destination indicated by the access disabled reference information and compares the setting information with the setting information set on the image forming apparatus 50. If the comparison results indicate a match, process is continued. If the two pieces of the setting information are different from each other, the CPU 51 determines whether the process is feasible with the acquired setting information. If the CPU 51 determines whether the process is feasible with the acquired setting information, the process is continued; or otherwise, the process is ended.

If the image forming apparatuses 50 used in the same operation method in terms of authentication/billing setting, function enabled/disabled setting or other settings set in the dynamic application operation, the same setting is not repeated on each image forming apparatus 50. Referring to FIG. 26, once the setting is performed only on the image forming apparatus 50*a*, the other image forming apparatuses 50 automatically follow the same setting, thereby setting the manager free from the setting and keeping the setting information in a correct form.

FIG. 27 illustrates a specific example of the setting file of the fourth exemplary embodiment. Referring to FIG. 27, the setting file is described in Extensible Markup Language (XML).

Referring to FIG. 27, <login> represents a login method and the reference destination of the setting information is Internet Protocol (IP) address "123.456.789.000." In this case, if the reference destination is unable to be referenced, a default value is not specified.

Referring to FIG. 27, <copy-color> represents an output color in copying and the reference destination of the setting information is IP address "123.456.789.000." In this case, if the reference destination is unable to be referenced, a default value is "color."

Referring to FIG. 27, <fax-support> indicates whether a fax function is available and the reference destination of the setting information is serial number "987.654.321." In this case, if the reference destination is unable to be referenced, a default value is "not supported."

Referring to FIG. 27, <billing-method> represents a billing method when the image forming apparatus 50 is used, the reference destination of the setting information is not specified and the setting information is "coinkit."

Multiple image forming apparatuses 50 are accessed to modify the setting of the image forming apparatus 50 in the setting file 70 in FIG. 27.

To this end, the setting information to be used is acquired by successively accessing IP address "123.456.789.000" and serial number "987.654.321" and the setting information in complete condition is thus reflected on the image forming apparatus 50. When the setting information is not acquired, a default value, if specified, is used. If the default value is not specified, the setting information originally set on the image forming apparatus 50 may be used.

If the setting information is dynamically referenced, the setting information and information on the reference destination are set on the image forming apparatus 50 when the setting information is updated. When an access request to the setting information is made, the setting information is acquired by accessing the image forming apparatus 50 as the reference destination. When the setting information is acquired, the function of the image forming apparatus 50 is enabled.

The setting information is described in the XML format in FIG. 27. The setting information may be described in any format, for example, Comma Separated Values (CSV) format or a text format.

To deal with the situation where the reference destination indicated by the reference information is unable to be accessed in the setting file reflection process, the default information is registered in advance on each piece of the reference information and then applied in the third and fourth exemplary embodiments if the reference information is not accessible.

Alternatively, for example, the default information and reference information (hereinafter referred to as “substitute reference information) serving as a substitute of the corresponding reference information are registered in advance on a server, such as the first server 10, as illustrated in FIG. 28 and if the reference information is inaccessible, the default information is applied.

Referring to FIG. 28, “9876” is registered as common default information at setting item A and “Ref-a” is registered as the substitute reference information. Also referring to FIG. 28, “1111” is registered as common default information at setting item B and “Ref-c” is registered as the substitute reference information. Also referring to FIG. 28, “none” as the default information indicates that the setting information is not present. Information corresponding to setting item C is not registered as illustrated in FIG. 28.

In the fourth exemplary embodiment in the same way as the previous embodiments, the creator enters, in the setting file production process, desired information or the reference information as the setting information at each setting item and then further enters the default information and the substitute reference information. The creator thus registers these pieces of information including the substitute reference information in the setting file database 13B in the first server 10.

Referring to FIG. 28, “Ref-a” is registered as the setting information at setting item B and “9999” is registered as the default information. If the replacement into the information registered in advance on the first server 10 or the like is not desirable, information indicating that the replacement is inhibited (“replacement inhibited” in FIG. 28) is described together with the setting information. If the default information and the substitute reference information are not set, information indicating that the setting is not performed (“not specified” in FIG. 28) is entered.

When the setting file production process is performed, the reference destination indicated by the reference information included in the setting file may be inaccessible and the default information and substitute reference information may not be set (“not specified” in FIG. 28). In such a case, the default information and substitute reference information related to the corresponding setting item registered in advance on the first server 10 or the like are read and serves as a substitute for the corresponding setting information.

Referring to FIG. 28, setting item A is “replacement inhibited” and thus not replaced. Since the substitute reference information is not specified at setting item B, the setting item B is thus replaced with the substitute reference information registered (“Ref-c” in FIG. 28).

According to the fourth exemplary embodiment, all the setting information is prepared and then reflected on the image forming apparatus 50.

According to each of the exemplary embodiments, the test environment is implemented using software. The disclosure is not limited to this method. For example, the test environment may be implemented using an actual image forming apparatus.

According to each of the exemplary embodiments, the creator enters the setting file. The disclosure is not limited to this method. For example, a setting file may be acquired from an image forming apparatus installed in an installation environment where the image forming apparatus 50 is to be installed and the creator may then correct and apply the setting file.

According to each of the exemplary embodiments, the databases are registered on the first server 10. The disclosure is not limited to this method. For example, the databases may be registered on an apparatus to which the second server 30, one of the image forming apparatuses 50, the second server 30 or the image forming apparatus 50 has access to.

The exemplary embodiments have been described. The scope of the disclosure is not limited to the scope of the exemplary embodiments. Modifications and changes are possible to the exemplary embodiments without departing from the scope of the disclosure. An exemplary embodiment as a result of the modifications and changes may fall within the scope of the disclosure.

The exemplary embodiments are not intended to limit the disclosure defined by the claims and all the combinations of features described with reference to the exemplary embodiments may not necessarily be required to achieve the disclosure. The exemplary embodiments include a variety of phases of the disclosure and a variety of versions of the disclosure may be formed by a combination of disclosed elements. Even if a subset of the elements is deleted from the exemplary embodiment, a configuration without the subset may still form the disclosure as long as an effect is obtained.

In the exemplary embodiments above, the term “processor” refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

According to the exemplary embodiments, each process is implemented by a software configuration, namely, by a computer that executes a program. The disclosure is not limited to this method. For example, each process may be implemented using a hardware configuration or a combination of the software and hardware configurations.

The first server 10, second server 30 and image forming apparatus 50 have been for exemplary purposes only. Without departing from the scope of the disclosure, an element of each of the apparatuses may be deleted or a new element may be added to the apparatuses.

The flow of each process has been described for exemplary purposes only. Without departing from the scope of the disclosure, a step may be deleted, a new step may be added or the order of operations may be changed.

In the exemplary embodiments above, the term “processor” is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system including:

one or more processors, each processor configured to:

if a setting item in a first setting file of a first target apparatus and a corresponding setting item in a second setting file of a second target apparatus have identical setting information set, register the second setting file by using, as setting information at the setting item in the second setting file, reference information referencing the identical setting information in the second setting file.

(((2)))

In the information processing system according to (((1))), the first setting file and the second setting file are stored in a cloud server.

(((3)))

In the information processing system according to (((2))), the processor is configured to, if the second target apparatus is installed at any location, set a setting file of the second target apparatus by downloading to the second target apparatus the second setting file from the cloud server.

(((4)))

In the information processing system according to (((3))), the processor is configured to set the setting information corresponding to the reference information in the setting file of the second target apparatus by reading the setting information from the first setting file or from the setting file of the first target apparatus and by replacing the reference information with the setting information.

(((5)))

In the information processing system according to (((4))), the processor is configured to store the reference information even after the reference information is replaced.

(((6)))

In the information processing system according to (((4))), the processor is configured to, if the second target apparatus applies the setting information in the setting file and the setting information is accompanied by the reference information, apply the setting information that is referenced by the reference information.

(((7)))

In the information processing system according to (((6))), the processor is configured to, if the setting information that the reference information references is unable to be applied, cancel an operation to use the setting information and/or notify a user that the setting information is unable to be applied.

(((8)))

In the information processing system according to one of (((4))) through (((7))), the processor is configured to:

register, in an associated form, the reference information and default information for the setting information corresponding to the reference information; and if the reference information is unable to be replaced, replace the reference information with the default information associated with the reference information.

(((9)))

In the information processing system according to (((8))), the processor is configured to register the default information in the second setting file.

(((10)))

In the information processing system according to one of (((4))) through (((9))), the processor is configured to inhibit setting information at a reference destination corresponding to the reference information from being another piece of reference information.

(((11)))

In the information processing system according to (((10))), the processor is configured to, if the reference information is replaced and the setting information at the reference destination corresponding to the reference information is the other piece of reference information, provide a notification that the reference information is illegal.

(((12)))

In the information processing system according to one of (((4))) through (((11))), the processor is configured to:

if the setting information corresponding to the reference information is unable to be read, register, in an associated form, the reference information and instruction information that indicates an instruction to attempt to read the setting information at a predetermined timing; and attempt to read the setting information at the predetermined timing.

(((13)))

In the information processing system according to (((11))), if the setting information is unable to be read when the first target apparatus is not operating.

What is claimed is:

1. An information processing system comprising:

one or more processors, each processor configured to:

if a setting item in a first setting file of a first target apparatus and a corresponding setting item in a second setting file of a second target apparatus have identical setting information set, register the second setting file by using, as setting information at the setting item in the second setting file, reference information referencing the identical setting information, wherein the second setting file of the second target apparatus stores, at the setting item, the reference information indicating a reference destination for referencing the identical setting information in the first setting file or in a setting file of the first target apparatus, and the processor is further configured to set the setting information corresponding to the reference information in a setting file of the second target apparatus by reading the identical setting information corresponding to the reference information from the first setting file or from the setting file of the first target apparatus and by replacing the reference information with the identical setting information.

2. The information processing system according to claim 1, wherein the first setting file and the second setting file are stored in a cloud server.

3. The information processing system according to claim 2, wherein the processor is configured to, if the second target apparatus is installed at any location, set the setting file of the second target apparatus by downloading to the second target apparatus the second setting file from the cloud server.

4. The information processing system according to claim 1, wherein the processor is configured to store the reference information even after the reference information is replaced.

5. The information processing system according to claim 1, wherein the processor is configured to, if the second target apparatus applies the setting information in the setting file and the setting information is accompanied by the reference information, apply the setting information that is referenced by the reference information.

6. The information processing system according to claim 5, wherein the processor is configured to, if the setting information that the reference information references is unable to be applied, cancel an operation to use the setting information and/or notify a user that the setting information is unable to be applied.

7. The information processing system according to claim 1, wherein the processor is configured to:

register, in an associated form, the reference information and default information for the setting information corresponding to the reference information; and if the reference information is unable to be replaced, replace the reference information with the default information associated with the reference information.

8. The information processing system according to claim 7, wherein the processor is configured to register the default information in the second setting file.

9. The information processing system according to claim 1, wherein the processor is configured to inhibit setting information at a reference destination corresponding to the reference information from being another piece of reference information.

10. The information processing system according to claim 9, wherein the processor is configured to, if the reference information is replaced and the setting information at the reference destination corresponding to the reference information is the other piece of reference information, provide a notification that the reference information is invalid.

11. The information processing system according to claim 1, wherein the processor is configured to:

if the setting information corresponding to the reference information is unable to be read, register, in an associated form, the reference information and instruction information that indicates an instruction to attempt to read the setting information at a predetermined timing; and attempt to read the setting information at the predetermined timing.

12. The information processing system according to claim 11, wherein the setting information is unable to be read when the first target apparatus is not operating.

13. A non-transitory computer readable medium storing a program causing a computer to execute a process for processing information, the process comprising:

if a setting item in a first setting file of a first target apparatus and a corresponding setting item in a second setting file of a second target apparatus have identical setting information set, registering the second setting file by using, as setting information at the setting item in the second setting file, reference information referencing the identical setting information, wherein the processor further comprising:

storing, at the setting item in the second setting file of the second target apparatus, the reference information indicating a reference destination for referencing the identical setting information in the first setting file or in a setting file of the first target apparatus, and setting the setting information corresponding to the reference information in a setting file of the second target apparatus by reading the identical setting information corresponding to the reference information from the first setting file or from the setting file of the first target apparatus and by replacing the reference information with the identical setting information.

14. An information processing method comprising:

if a setting item in a first setting file of a first target apparatus and a corresponding setting item in a second setting file of a second target apparatus have identical setting information set, registering the second setting file by using, as setting information at the setting item in the second setting file, reference information referencing the identical setting information, wherein the information processing method further comprising:

storing, at the setting item in the second setting file of the second target apparatus, the reference information indicating a reference destination for referencing the identical setting information in the first setting file or in a setting file of the first target apparatus, and setting the setting information corresponding to the reference information in a setting file of the second target apparatus by reading the identical setting information corresponding to the reference information from the first setting file or from the setting file of the first target apparatus and by replacing the reference information with the identical setting information.

* * * * *